(12) United States Patent
Raksha et al.

(10) Patent No.: US 9,257,059 B2
(45) Date of Patent: Feb. 9, 2016

(54) DYNAMIC APPEARANCE-CHANGING OPTICAL DEVICES (DACOD) PRINTED IN A SHAPED MAGNETIC FIELD INCLUDING PRINTABLE FRESNEL STRUCTURES

(71) Applicant: Viavi Solutions Inc., Milpitas, CA (US)

(72) Inventors: Vladimir P. Raksha, Santa Rosa, CA (US); Paul G. Coombs, Santa Rosa, CA (US); Charles T. Markantes, Santa Rosa, CA (US); Alberto Argoitia, Santa Rosa, CA (US); Roger W. Phillips, Santa Rosa, CA (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 0 days.

(21) Appl. No.: 13/689,110

(22) Filed: Nov. 29, 2012

(65) Prior Publication Data

US 2013/0084411 A1    Apr. 4, 2013

Related U.S. Application Data

(60) Division of application No. 11/278,600, filed on Apr. 4, 2006, now Pat. No. 8,343,615, which is a continuation-in-part of application No. 11/313,165, filed on Dec. 20, 2005, now Pat. No. 7,604,855, which (Continued)

(51) Int. Cl.
*G09F 3/03* (2006.01)
*G02B 5/09* (2006.01)
(Continued)

(52) U.S. Cl.
CPC ............ *G09F 3/0376* (2013.01); *B41M 3/148* (2013.01); *B42D 25/29* (2013.01); *G02B 5/09* (2013.01); *G02B 26/026* (2013.01); *B42D 2033/16* (2013.01); *B42D 2035/20* (2013.01); *Y10T 428/24802* (2015.01); *Y10T 428/25* (2015.01)

(58) Field of Classification Search
None
See application file for complete search history.

(56) References Cited

U.S. PATENT DOCUMENTS 2,570,856 A    10/1951  Pratt et al. ................... 41/32
3,011,383 A    12/1961  Sylvester et al. ............ 359/584
(Continued)

FOREIGN PATENT DOCUMENTS

AU    488652    11/1977  ............ B44F 1/12
DE    1696245    1/1972   ............ D21H 5/10
(Continued)

OTHER PUBLICATIONS

Search Report for EP Appln No. 10011762, Feb. 12, 2013.
(Continued)

*Primary Examiner* — Gerard Higgins
*Assistant Examiner* — Sathavaram I Reddy
(74) *Attorney, Agent, or Firm* — VLP Law Group LLP; Jeremy A. Cubert

(57) ABSTRACT

A device includes a substrate and at least 1,000 flakes resting upon the substrate, each flake including a magnetic layer. The plurality of flakes are aligned so as to form a plurality of rings or curves, wherein within each ring or curve, flakes are tilted at a same angle with respect to the substrate and planes extending from surfaces of said flakes intersect with one another. The device provides a visible image of a single ring or curve when illuminated with a single light source, and three rings or curves are visible when three light sources illuminate the device. The device may be used as a printed light detector.

6 Claims, 29 Drawing Sheets

Related U.S. Application Data is a continuation-in-part of application No. 11/022,106, filed on Dec. 22, 2004, now Pat. No. 7,517,578, which is a continuation-in-part of application No. 10/386,894, filed on Mar. 11, 2003, now Pat. No. 7,047,883, said application No. 11/278,600 is a continuation-in-part of application No. 11/028,819, filed on Jan. 4, 2005, now Pat. No. 7,300,695, which is a division of application No. 10/243,111, filed on Sep. 13, 2002, now Pat. No. 6,902,807.

(60) Provisional application No. 60/410,546, filed on Sep. 13, 2002, provisional application No. 60/410,547, filed on Sep. 13, 2002, provisional application No. 60/396,210, filed on Jul. 15, 2002, provisional application No. 60/777,086, filed on Feb. 27, 2006, provisional application No. 60/668,852, filed on Apr. 6, 2005.

(51) Int. Cl.
*G02B 26/02* (2006.01)
*B41M 3/14* (2006.01)
*B42D 25/29* (2014.01)

(56) References Cited

U.S. PATENT DOCUMENTS

| | | | | |
|---|---|---|---|---|
| 3,123,490 A | 3/1964 | Bolomey et al. | | 106/291 |
| 3,338,730 A | 8/1967 | Slade et al. | | 428/142 |
| 3,610,721 A | 10/1971 | Abramson et al. | | 350/3.5 |
| 3,627,580 A | 12/1971 | Krall | | 117/238 |
| 3,633,720 A | 1/1972 | Tyler | | 400/105 |
| 3,676,273 A | 7/1972 | Graves | | 428/328 |
| 3,790,407 A | 2/1974 | Merton et al. | | 428/148 |
| 3,791,864 A | 2/1974 | Steingroever | | 117/238 |
| 3,845,499 A | 10/1974 | Ballinger | | 346/74.3 |
| 3,853,676 A | 12/1974 | Graves | | 161/5 |
| 3,873,975 A | 3/1975 | Miklos et al. | | 360/25 |
| 4,011,009 A | 3/1977 | Lama et al. | | 359/571 |
| 4,054,922 A | 10/1977 | Fichter | | 346/74.3 |
| 4,066,280 A | 1/1978 | LaCapria | | 283/91 |
| 4,099,838 A | 7/1978 | Cook et al. | | 359/537 |
| 4,126,373 A | 11/1978 | Moraw | | 359/2 |
| 4,155,627 A | 5/1979 | Gale et al. | | 359/568 |
| 4,168,983 A | 9/1979 | Vittands et al. | | 106/14.12 |
| 4,197,563 A | 4/1980 | Michaud | | 346/74.3 |
| 4,244,998 A | 1/1981 | Smith | | |
| 4,271,782 A | 6/1981 | Bate et al. | | 118/623 |
| 4,310,584 A | 1/1982 | Cooper et al. | | 428/212 |
| 4,398,798 A | 8/1983 | Krawczak et al. | | 359/573 |
| 4,434,010 A | 2/1984 | Ash | | 106/415 |
| 4,543,551 A | 9/1985 | Petersen | | 335/284 |
| 4,705,300 A | 11/1987 | Berning et al. | | 283/91 |
| 4,705,356 A | 11/1987 | Berning et al. | | 350/166 |
| 4,721,217 A | 1/1988 | Phillips et al. | | 215/230 |
| 4,756,771 A | 7/1988 | Brodalla et al. | | 148/244 |
| 4,779,898 A | 10/1988 | Berning et al. | | 283/58 |
| 4,788,116 A | 11/1988 | Hochberg | | 430/21 |
| 4,838,648 A | 6/1989 | Phillips et al. | | 359/585 |
| 4,867,793 A | 9/1989 | Franz et al. | | 106/415 |
| 4,923,533 A | 5/1990 | Shigeta et al. | | 148/304 |
| 4,930,866 A | 6/1990 | Berning et al. | | 359/589 |
| 4,931,309 A | 6/1990 | Komatsu et al. | | 427/549 |
| 5,002,312 A | 3/1991 | Phillips et al. | | 283/72 |
| 5,009,486 A | 4/1991 | Dobrowolski et al. | | 359/580 |
| 5,059,245 A | 10/1991 | Phillips et al. | | 106/31.65 |
| 5,079,058 A | 1/1992 | Tomiyama | | 428/40 |
| 5,079,085 A | 1/1992 | Hashimoto et al. | | 428/327 |
| 5,084,351 A | 1/1992 | Philips et al. | | 428/411.1 |
| 5,106,125 A | 4/1992 | Antes | | 283/91 |
| 5,128,779 A | 7/1992 | Mallik | | 359/2 |
| 5,135,812 A | 8/1992 | Phillips et al. | | 428/403 |
| 5,142,383 A | 8/1992 | Mallik | | 359/2 |
| 5,171,363 A | 12/1992 | Phillips et al. | | 106/31.65 |
| 5,177,344 A | 1/1993 | Pease | | 235/449 |
| 5,186,787 A | 2/1993 | Phillips et al. | | 216/36 |
| 5,192,611 A | 3/1993 | Tomiyama et al. | | 428/354 |
| 5,214,530 A | 5/1993 | Coombs et al. | | 359/359 |
| 5,223,360 A | 6/1993 | Prengel et al. | | 430/39 |
| 5,254,390 A | 10/1993 | Lu | | 428/156 |
| 5,278,590 A | 1/1994 | Phillips et al. | | 359/589 |
| 5,279,657 A | 1/1994 | Phillips et al. | | 106/31.65 |
| 5,339,737 A | 8/1994 | Lewis et al. | | 101/454 |
| 5,364,467 A | 11/1994 | Schmid et al. | | 106/404 |
| 5,364,689 A | 11/1994 | Kashiwagi et al. | | 428/195 |
| 5,368,898 A | 11/1994 | Akedo | | 427/510 |
| 5,411,296 A | 5/1995 | Mallik | | 283/86 |
| 5,424,119 A | 6/1995 | Phillips et al. | | 428/328 |
| 5,437,931 A | 8/1995 | Tsai et al. | | 428/446 |
| 5,447,335 A | 9/1995 | Haslop | | 283/91 |
| 5,464,710 A | 11/1995 | Yang | | 430/1 |
| 5,474,814 A | 12/1995 | Komatsu et al. | | 427/549 |
| 5,549,774 A | 8/1996 | Miekka et al. | | 156/209 |
| 5,549,953 A | 8/1996 | Li | | 428/64.1 |
| 5,571,624 A | 11/1996 | Phillips et al. | | 428/403 |
| 5,591,527 A | 1/1997 | Lu | | 428/411.1 |
| 5,613,022 A | 3/1997 | Odhner et al. | | 385/37 |
| 5,624,076 A | 4/1997 | Miekka et al. | | 241/3 |
| RE35,512 E | 5/1997 | Nowak et al. | | 101/454 |
| 5,627,663 A | 5/1997 | Horan et al. | | 359/2 |
| 5,629,068 A | 5/1997 | Miekka et al. | | 428/148 |
| 5,630,877 A | 5/1997 | Kashiwagi et al. | | 118/623 |
| 5,648,165 A | 7/1997 | Phillips et al. | | 428/346 |
| 5,650,248 A | 7/1997 | Miekka et al. | | 430/1 |
| 5,672,410 A | 9/1997 | Miekka et al. | | 428/148 |
| 5,700,550 A | 12/1997 | Uyama et al. | | 428/212 |
| 5,742,411 A | 4/1998 | Walters | | 359/2 |
| 5,744,223 A | 4/1998 | Abersfelder et al. | | 428/206 |
| 5,763,086 A | 6/1998 | Schmid et al. | | 428/404 |
| 5,811,775 A | 9/1998 | Lee | | 235/457 |
| 5,815,292 A | 9/1998 | Walters | | 359/2 |
| 5,856,048 A | 1/1999 | Tahara et al. | | 430/1 |
| 5,858,078 A | 1/1999 | Andes et al. | | 106/437 |
| 5,907,436 A | 5/1999 | Perry et al. | | 359/576 |
| 5,912,767 A | 6/1999 | Lee | | 359/567 |
| 5,989,626 A | 11/1999 | Coombs et al. | | 427/162 |
| 5,991,078 A | 11/1999 | Yoshitake et al. | | 359/567 |
| 6,013,370 A | 1/2000 | Coulter et al. | | 428/403 |
| 6,031,457 A | 2/2000 | Bonkowski et al. | | 340/572.1 |
| 6,033,782 A | 3/2000 | Hubbard et al. | | 428/407 |
| 6,043,936 A | 3/2000 | Large | | 359/572 |
| 6,045,230 A | 4/2000 | Dreyer et al. | | 359/529 |
| 6,060,143 A | 5/2000 | Tompkin et al. | | 428/64.1 |
| 6,068,691 A | 5/2000 | Miekka et al. | | 106/403 |
| 6,103,361 A | 8/2000 | Batzar et al. | | 428/323 |
| 6,112,388 A | 9/2000 | Kimoto et al. | | 29/17.3 |
| 6,114,018 A | 9/2000 | Phillips et al. | | 428/200 |
| 6,150,022 A | 11/2000 | Coulter et al. | | 428/403 |
| 6,157,489 A | 12/2000 | Bradley, Jr. et al. | | 359/584 |
| 6,168,100 B1 | 1/2001 | Kato et al. | | 241/1 |
| 6,241,858 B1 | 6/2001 | Phillips et al. | | 204/192.15 |
| 6,242,510 B1 | 6/2001 | Killey | | 523/204 |
| 6,243,204 B1 | 6/2001 | Bradley, Jr. et al. | | 359/585 |
| 6,403,169 B1 | 6/2002 | Hardwick et al. | | 427/548 |
| 6,549,131 B1 | 4/2003 | Cote et al. | | 340/572.1 |
| 6,586,098 B1 | 7/2003 | Coulter et al. | | 428/403 |
| 6,589,331 B2 | 7/2003 | Ostertag et al. | | 106/460 |
| 6,643,001 B1 | 11/2003 | Faris | | 356/37 |
| 6,649,256 B1 | 11/2003 | Buczek et al. | | 428/323 |
| 6,686,027 B1 | 2/2004 | Caporaletti et al. | | 428/195.1 |
| 6,692,031 B2 | 2/2004 | McGrew | | 283/93 |
| 6,692,830 B2 | 2/2004 | Argoitia et al. | | 428/403 |
| 6,712,399 B1 | 3/2004 | Drinkwater et al. | | 283/111 |
| 6,749,777 B2 | 6/2004 | Argoitia et al. | | 252/582 |
| 6,749,936 B2 | 6/2004 | Argoitia et al. | | 428/402 |
| 6,751,022 B2 | 6/2004 | Phillips | | 359/577 |
| 6,759,097 B2 | 7/2004 | Phillips et al. | | 427/510 |
| 6,761,959 B1 | 7/2004 | Bonkowski et al. | | 428/156 |
| 6,808,806 B2 | 10/2004 | Phillips et al. | | 428/403 |
| 6,815,065 B2 | 11/2004 | Argoitia et al. | | 428/403 |
| 6,818,299 B2 | 11/2004 | Phillips et al. | | 428/403 |
| 6,838,166 B2 | 1/2005 | Phillips et al. | | 428/323 |

(56) References Cited

U.S. PATENT DOCUMENTS

| | | | |
|---|---|---|---|
| 6,841,238 B2 | 1/2005 | Argoitia et al. | 428/323 |
| 6,902,607 B2 | 6/2005 | Matsumoto et al. | 106/31.47 |
| 6,902,807 B1 | 6/2005 | Argoitia et al. | 428/403 |
| 6,987,590 B2 | 1/2006 | Phillips et al. | 359/2 |
| 7,029,525 B1 | 4/2006 | Mehta | 106/31.6 |
| 7,047,883 B2 | 5/2006 | Raksha et al. | 101/489 |
| 2002/0182383 A1 | 12/2002 | Phillips et al. | 428/199 |
| 2003/0058491 A1 | 3/2003 | Holmes et al. | 359/2 |
| 2003/0087070 A1 | 5/2003 | Souparis | 283/91 |
| 2003/0165637 A1 | 9/2003 | Phillips et al. | 427/598 |
| 2003/0190473 A1 | 10/2003 | Argoitia et al. | 428/403 |
| 2004/0009309 A1 | 1/2004 | Raksha et al. | 427/598 |
| 2004/0051297 A1 | 3/2004 | Raksha et al. | 283/57 |
| 2004/0081807 A1 | 4/2004 | Bonkowski et al. | 428/195.1 |
| 2004/0094850 A1 | 5/2004 | Bonkowski et al. | 264/1.34 |
| 2004/0100707 A1 | 5/2004 | Kay et al. | 359/883 |
| 2004/0105963 A1 | 6/2004 | Bonkowski et al. | 428/195.1 |
| 2004/0151827 A1 | 8/2004 | Argoitia et al. | 427/7 |
| 2005/0037192 A1 | 2/2005 | Argoitia et al. | 428/323 |
| 2005/0063067 A1 | 3/2005 | Phillips et al. | 359/614 |
| 2005/0106367 A1 | 5/2005 | Raksha et al. | 428/199 |
| 2005/0123755 A1 | 6/2005 | Argoitia et al. | 428/402 |
| 2005/0128543 A1 | 6/2005 | Phillips et al. | 359/15 |
| 2005/0189060 A1 | 9/2005 | Huang et al. | 156/99 |
| 2006/0035080 A1 | 2/2006 | Argoitia | 428/402 |
| 2006/0077496 A1 | 4/2006 | Argoitia | 359/2 |
| 2006/0263539 A1 | 11/2006 | Argoitia | 427/547 |
| 2007/0058227 A1 | 3/2007 | Raksha et al. | 359/2 |

FOREIGN PATENT DOCUMENTS

| | | | |
|---|---|---|---|
| DE | 3932505 | 4/1991 | B44F 1/12 |
| DE | 4212290 | 5/1993 | |
| DE | 4343387 | 6/1995 | B44F 1/12 |
| DE | 19611383 | 9/1997 | B44F 1/12 |
| DE | 19731968 | 1/1999 | B44F 1/12 |
| DE | 19744953 | 4/1999 | B44F 1/12 |
| DE | 19639165 | 10/2003 | C09B 67/02 |
| EP | 0138194 | 10/1984 | B32B 27/08 |
| EP | 0185396 | 12/1985 | D21H 5/10 |
| EP | 0341002 | 11/1989 | G02B 5/28 |
| EP | 0341002 B2 | 11/1989 | |
| EP | 0420261 | 4/1991 | G06K 19/00 |
| EP | 0453131 | 10/1991 | |
| EP | 0556449 | 8/1993 | B05D 3/14 |
| EP | 0556449 B1 | 8/1993 | |
| EP | 0406667 | 1/1995 | B44C 1/00 |
| EP | 406667 B1 | 1/1995 | |
| EP | 0660262 | 1/1995 | G06K 19/16 |
| EP | 0170439 | 4/1995 | G02B 5/20 |
| EP | 0710508 | 5/1996 | B05D 3/14 |
| EP | 710508 A1 | 5/1996 | |
| EP | 0756945 | 2/1997 | B42D 15/00 |
| EP | 0395410 | 8/1997 | G02B 5/20 |
| EP | 0698256 | 10/1997 | G06K 19/14 |
| EP | 0741370 | 5/1998 | G06K 19/18 |
| EP | 0914261 | 5/1999 | B42D 15/10 |
| EP | 0953937 | 11/1999 | G06K 19/08 |
| EP | 0953937 A1 | 11/1999 | |
| EP | 0978373 | 2/2000 | B32B 7/02 |
| EP | 1174278 | 1/2002 | |
| EP | 1239307 | 9/2002 | G02B 5/22 |
| EP | 1 353 197 | 10/2003 | G02B 5/18 |
| EP | 1 498 545 A | 1/2005 | D21H 21/42 |
| EP | 1516957 | 3/2005 | |
| EP | 1529653 | 5/2005 | |
| EP | 1719636 | 11/2006 | B42D 15/10 |
| EP | 1 741 757 | 1/2007 | C09C 1/00 |
| GB | 1107395 | 3/1968 | G03G 1/00 |
| GB | 1131038 | 10/1968 | B44F 3/00 |
| JP | 63172779 | 7/1988 | C09D 5/29 |
| JP | 63172279 | 7/1998 | |
| JP | 11010771 | 1/1999 | B32B 7/02 |
| WO | WO88/07214 | 9/1988 | G02B 5/128 |
| WO | 93/23251 | 11/1993 | B41M 3/14 |
| WO | 95/17475 | 1/1995 | C09C 1/00 |
| WO | 95/13569 | 5/1995 | G03F 7/00 |
| WO | 97/19820 | 6/1997 | B42D 15/10 |
| WO | 98/12583 | 3/1998 | G02B 5/28 |
| WO | 00/08596 | 2/2000 | G06K 19/06 |
| WO | 01/03945 | 1/2001 | B42D 15/10 |
| WO | 02/53677 | 1/2001 | B42D 15/10 |
| WO | 01/53113 A | 7/2001 | B42D 15/10 |
| WO | 02/00446 | 1/2002 | B42D 15/10 |
| WO | 02/04234 | 1/2002 | |
| WO | 02/40599 | 5/2002 | C09C 1/00 |
| WO | 02/40600 | 5/2002 | |
| WO | WO02/40600 | 5/2002 | C09C 1/00 |
| WO | WO02/090002 | 11/2002 | B05D 3/14 |
| WO | 03/011980 | 2/2003 | C09C 1/00 |
| WO | 03/102084 | 12/2003 | C09C 1/00 |
| WO | 2004/007096 | 1/2004 | B05D 5/06 |
| WO | 2004/024836 | 3/2004 | |
| WO | 2005/000585 | 1/2005 | B41F 15/08 |
| WO | 2005/017048 | 2/2005 | C09C 1/00 |

OTHER PUBLICATIONS

The Mearl Corporation Brochure for "Mearl Iridescent Film" Peekskill, NY, 1986.

The R.D. Mathis Company Manual for "Thin Film Evaporation Source Reference" Long Beach, CA, Oct. 2001.

Alberto Argoitia, "Pigments Exhibiting a Combination of Thin Film and Diffractive Light Interference", AIMCAL Fall Technical Conference, 16th International Vacuum Web Coating Conference, Jan. 2002, pp. 1-9.

R. Domnick et al, "Influence of Nanosized Metal Clusters on the Generation of Strong Colors and Controlling of their Properties through Physical Vapor Deposition (PVD)" 49th Annual Technical Conference Proceedings (2006), Society of vacuum Coasters.

Argoitia et al. "The concept of printable holograms through the alignment of diffractive pigments" Electronic Imaging Science and Technology Proceedings, SPIE vol. 5310, Jan. 2004.

Dobrowolski et al., "Research on Thin Film Anticounterfeiting Coatings at the National Research Council of Canada", Applied Optics, vol. 28, No. 14, pp. 2702-2717 (Jul. 15, 1989).

Powell et al, (Ed.), Vapor Deposition, John Wiley & Sons, p. 132 (1996).

Van Renesse (Ed.), Optical Document Security, $2^{nd}$ Ed., Artech House, 254, 349-69 (1997).

Prokes et al (Ed.), Novel Methods of Nanoscale Wire Formation, Mat. Research Soc. Bul., pp. 13-14 (Aug. 1999).

Lotz et al., Optical Layers on Large Area Plastic Films, Precision, Applied Films (Nov. 2001).

Argoitia et al, "Pigments Exhibiting Diffractive Effects", Soc. of Vac. Coaters, $45^{th}$ Annual Tech. Conf. Proceed. (2002).

Argoitia et al, "The concept of printable holograms through the alignment of diffractive pigments", SPIE Conference on Document Security, Jan. 2004.

Coombs et al, "Integration of contracting technologies into advanced optical security devices", SPIE Conference on Document Security, Jan. 2004.

Llewellyn, "Dovids: Functional Beauty—discussion about holography", Paper, Film, and Foil Converter, Aug. 2002.

Hardin, "Optical tricks designed to foil counterfeiters" OE Reports, No. 191, Nov. 1999.

Argoitia and Witzman, Pigments Exhibiting Diffractive Effects, Soc. of Vac. Coaters, $45^{th}$ Annual Tech. Conf. Proceed. (2002).

Powell et al (Ed) "Vapor Deposition" John Wiley & Sons, p. 132 (1996).

Van Renesse (Ed) "Optical Document Security" $2^{nd}$ Ed., Artech House, 254, 349-69 (1997).

Dobrowolski et al, "Research on Thin Film Anticounterfeiting Coatings at the National Research Council of Canada", Applied Optics, vol. 28, No. 14, pp. 2701-2717 (Jul. 15, 1989).

Lotz et al., "Optical Layers on Large Area Plastic Films" Precision, Applied Films (Nov. 2001).

Himpsel et al, "Nanowires by Step Decoration", Mat. Research Soc. Bul., p. 20-24 (Aug. 1999).

(56) References Cited

OTHER PUBLICATIONS

Prokes and Wang (Ed)., "Novel Methods of Nanoscale Wire Formation", Mat. Reseach Soc. Bul. pp. 13-14 (Aug. 1999).

"Optical Thin-Film Security Devices", J.A. Dobrowolski, Optical Security Document, Rudolf Van Renesse, Artech House, 1998, pp. 289-328.

"Paper Based Document Security—a Review" Rudolf L. van Renesse, European Conference on Security and Detection, Apr. 28-30, 1997, Conference Publication No. 437, p. 75-80.

Diffractive Microstructures for Security Applications: M. T. Gale, Paul Scherrer Institute, Zurich, IEEE Conference Publication London 1991, pp. 205-209, Sep. 16-18, 1991.

Definition of "directly" from Webster's Third New International Dictionary, 1993, p. 641.

John M. McKiernan et al; "Luminescence and Laser Action of Coumarin Dyes Doped in Silicate and Aluminosilicate Glasses Prepared by Sol-Gel Technique," Journal of Inorganic and Organometallic Polymers, vol. 1, No. 1, 1991, pp. 87-103.

Jeffrey I. Zink et al, "Optical Probes and Properties of Aluminosilicate Glasses Prepared by the Sol-Gel Method," Polym. Mater. Sci. Eng., pp. 204-208 (1989).

"Security Enhancement of Holograms with Interference Coatings" by Phillips et al. Optical Security and Counterfeit Deterrence Techniques III Proceedings of SPIE vol. 3973 p. 304-316 (2000).

Don W. Tomkins, Kurz Hastings, "Transparent Overlays for Security Printing and Plastic ID Cards" pp. 1-8, Nov. 1997.

J.A. Dobrowolski et al, "Optical Interference Coatings for Inhibiting of Counterfeiting" Optica Acta, 1973, vol. 20, No. 12, 925-037.

Minolta Manual for "Precise Color Communication, Color Control From Feeling to Instrumentation" pp. 18, 20, 22-23, 46-49.

Frans Defilet, LGZ Landis & Gyr Zug Corporation, "Kinegrams 'Optical Variable Devices' (OVD's) for Banknotes, Security Documents and Plastic Cards" San Diego, Apr. 1-3, 1987.

S.P. McGrew, "Hologram Counterfeiting: Problems and Solutions" SPIE, vol. 1210 Optical Security and Anticounterfeiting Systems, 1990, pp. 66-76.

Rudolf L. van Renesse, "Security Design of Valuable Documents and Products" SPIE, vol. 2659, Jun. 1996, pp. 10-20.

Steve McGrew, "Countermeasures Against Hologram Counterfeiting" Internet site www.iea.com/nli/publications/countermeasures.htm, Jan. 6, 2000.

Roger W. Phillips, "Optically Variable Films, Pigments, and Inks" SPIE vol. 1323 Optical Thin Films III: New Developments, 1990, pp. 98-109.

Roger W. Phillips et al. "Optical Coatings for Document Security" Applied Optics, vol. 35, No. 28, Oct. 1, 1996 pp. 5529-5534.

J. Rolfe "Optically Variable Devices for use on Bank Notes" SPIE, vol. 1210 Optical Security and Anticounterfeiting Systems, pp. 14-19, 1990.

OVD Kinegram Cor "OVD Kinegram Management of Light to Provide Security" Internet site www.kiknegram.com.xhome.html, Dec. 17, 1999.

I.M. Boswarva et al., "Roll Coater System for the Production of Optically Variable Devices (OVD's) for Security Applications" Proceedings, 33$^{rd}$ Annual technical Conference, Society of Vacuum Coaters, pp. 103-109 (1990).

Halliday et al, "Fundmental of Physics, Sixth Edition" p. 662, Jul. 2000.

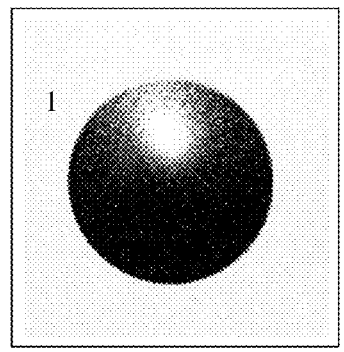 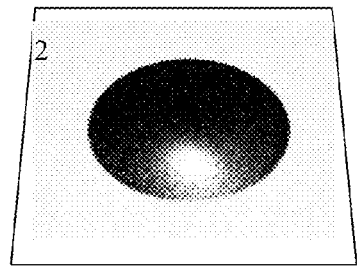
FIG. 28A  FIG. 28B
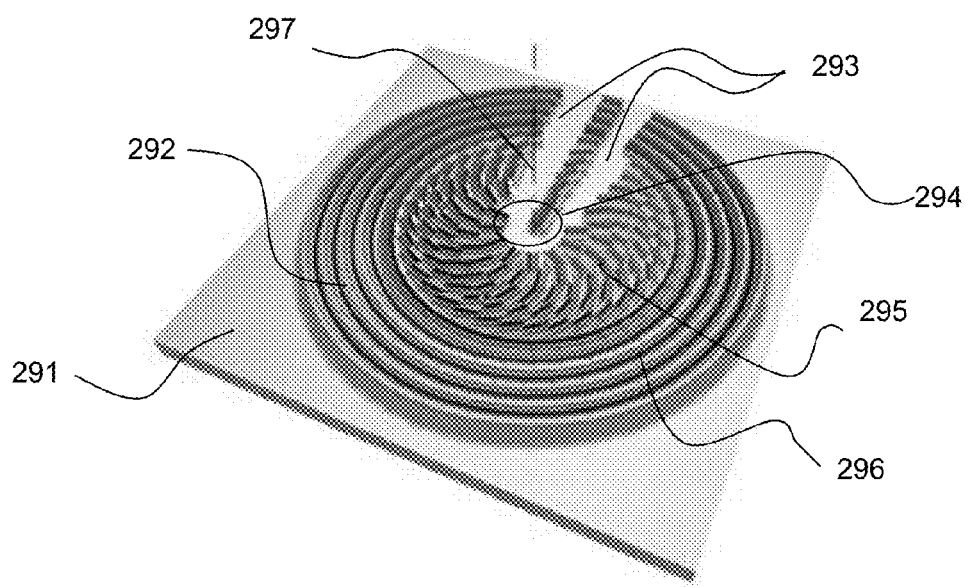
FIG. 29

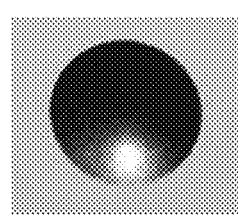 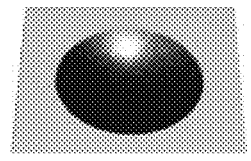 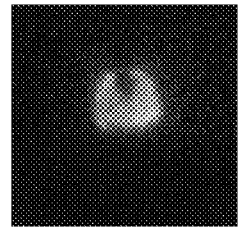
FIG. 34A   FIG. 34B   FIG. 34C
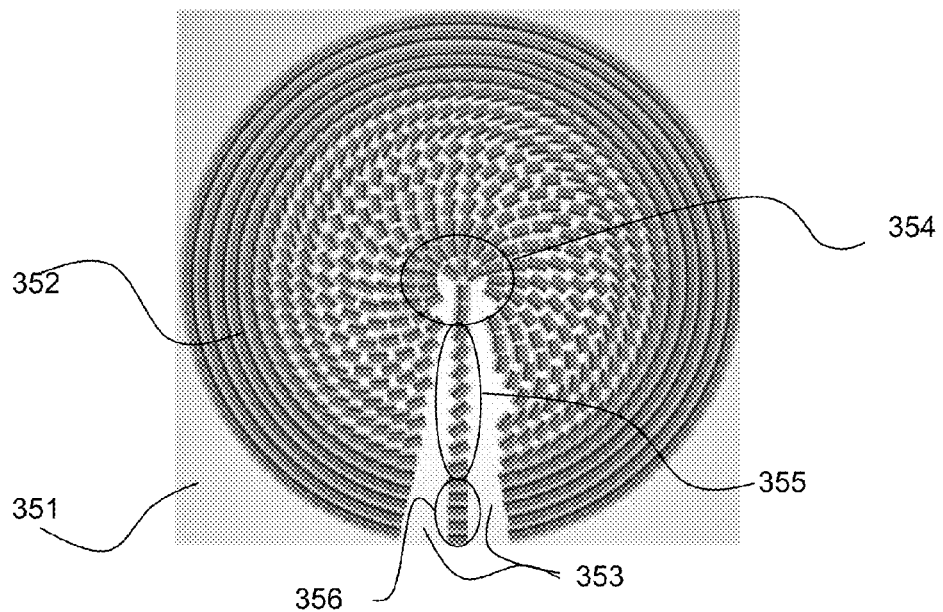
FIG. 35

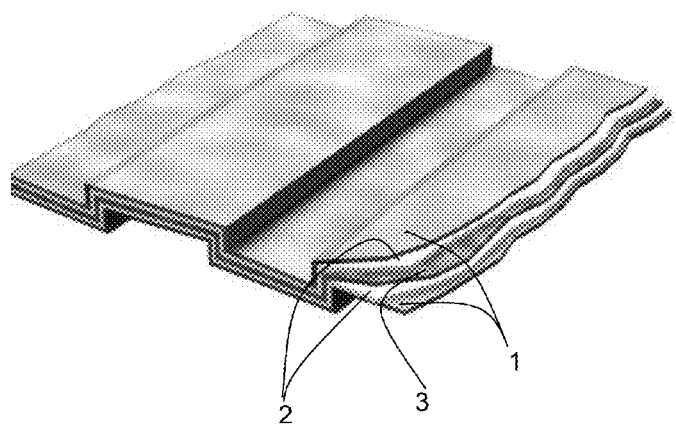
FIG. 41
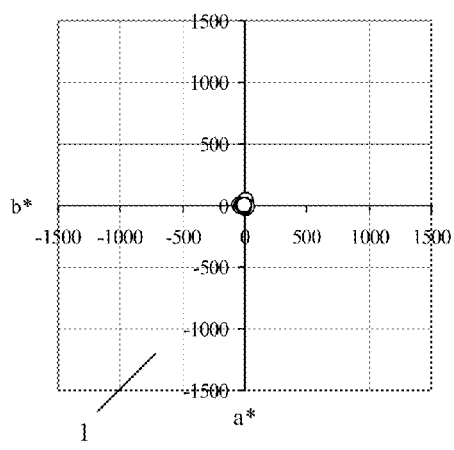
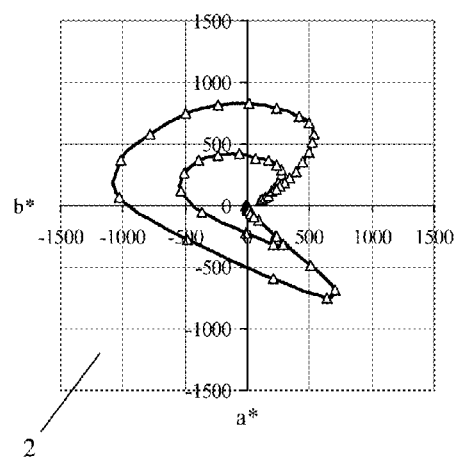
FIG. 42A  FIG. 42B

DYNAMIC APPEARANCE-CHANGING OPTICAL DEVICES (DACOD) PRINTED IN A SHAPED MAGNETIC FIELD INCLUDING PRINTABLE FRESNEL STRUCTURES

CROSS-REFERENCE TO RELATED APPLICATIONS

The present application is a divisional of U.S. patent application Ser. No. 11/278,600 filed Apr. 4, 2006 which is a continuation-in-part of U.S. patent application Ser. No. 11/313,165 filed Dec. 20, 2005, which is a continuation-in-part of U.S. patent application Ser. No. 11/022,106, filed Dec. 22, 2004, which is a continuation-in-part from U.S. patent application Ser. No. 10/386,894 filed Mar. 11, 2003, which claims priority from U.S. Provisional Patent Application Ser. No. 60/410,546 filed Sep. 13, 2002; from U.S. Provisional Patent Application Ser. No. 60/410,547 filed Sep. 13, 2002; from U.S. Provisional Patent Application Ser. No. 60/396,210 filed Jul. 15, 2002 by the disclosures of which are hereby incorporated in their entirety for all purposes; and U.S. patent application Ser. No. 11/278,600 filed Apr. 4, 2006 is a continuation-in-part of U.S. patent application Ser. No. 11/028,819 filed Jan. 4, 2005 which is a divisional of U.S. patent application Ser. No. 10/243,111 filed Sep. 13, 2002, issued as U.S. Pat. No. 6,902,807 on Jun. 7, 2005 by the disclosures of which are hereby incorporated in their entirety for all purposes. U.S. patent application Ser. No. 11/278,600 filed Apr. 4, 2006 also claims priority from U.S. Provisional Patent Applications Ser. No. 60/777,086 filed Feb. 27, 2006 and Ser. No. 60/668,852 filed Apr. 6, 2005 which are all incorporated herein by reference. U.S. patent application Ser. No. 11/278,600 filed Apr. 4, 2006 is related to U.S. patent application Ser. No. 10/029,405, filed Dec. 20, 2001 now issued as U.S. Pat. No. 6,749,936; Ser. No. 09/919,346, filed Jul. 31, 2001 now issued as U.S. Pat. No. 6,692,830; and Ser. No. 10/117,307 filed Apr. 5, 2002 now issued as U.S. Pat. No. 6,841,238; which are incorporated herein by reference for all purposes.

FIELD OF THE INVENTION

This invention relates generally to optically variable pigments, films, devices, and images, and more particularly to aligning or orienting magnetic flakes, such as during a painting or printing process, to obtain an illusive optical effect.

Optically variable devices are used in a wide variety of applications, both decorative and utilitarian, for example such devices are used as security devices on commercial products. Optically variable devices can be made in numerous ways to achieve a variety of effects. Examples of optically variable devices include the holograms imprinted on credit cards and authentic software documentation, colour-shifting images printed on banknotes, and enhancing the surface appearance of items such as motorcycle helmets and wheel covers.

Optically variable devices can be made as film or foil that is pressed, stamped, glued, or otherwise attached to an object, and can also be made using optically variable pigments. One type of optically variable pigment is commonly called a colour-shifting pigment because the apparent colour of images appropriately printed with such pigments changes as the angle of view and/or illumination is tilted. A common example is the "20" printed with colour-shifting pigment in the lower right-hand corner of a U.S. twenty-dollar bill, which serves as an anti-counterfeiting device.

Some anti-counterfeiting devices are covert, while others are intended to be noticed. Unfortunately, some optically variable devices that are intended to be noticed are not widely known because the optically variable aspect of the device is not sufficiently dramatic. For example, the colour shift of an image printed with colour-shifting pigment might not be noticed under uniform fluorescent ceiling lights, but more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

Optically variable devices can also be made with magnetic pigments that are aligned with a magnetic field after applying the pigment (typically in a carrier such as an ink vehicle or a paint vehicle) to a surface. However, painting with magnetic pigments has been used mostly for decorative purposes. For example, use of magnetic pigments has been described to produce painted cover wheels having a decorative feature that appears as a three-dimensional shape. A pattern was formed on the painted product by applying a magnetic field to the product while the paint medium still was in a liquid state. The paint medium had dispersed magnetic non-spherical particles that aligned along the magnetic field lines. The field had two regions. The first region contained lines of a magnetic force that were oriented parallel to the surface and arranged in a shape of a desired pattern. The second region contained lines that were non-parallel to the surface of the painted product and arranged around the pattern. To form the pattern, permanent magnets or electromagnets with the shape corresponding to the shape of desired pattern were located underneath the painted product to orient in the magnetic field non-spherical magnetic particles dispersed in the paint while the paint was still wet. When the paint dried, the pattern was visible on the surface of the painted product as the light rays incident on the paint layer were influenced differently by the oriented magnetic particles.

Similarly, a process for producing a pattern of flaked magnetic particles in fluoropolymer matrix has been described. After coating a product with a composition in liquid form, a magnet with a magnetic field having a desirable shape was placed on the underside of the substrate. Magnetic flakes dispersed in a liquid organic medium orient themselves parallel to the magnetic field lines, tilting from the original planar orientation. This tilt varied from perpendicular to the surface of a substrate to the original orientation, which included flakes essentially parallel to the surface of the product. The planar oriented flakes reflected incident light back to the viewer, while the reoriented flakes did not, providing the appearance of a three dimensional pattern in the coating.

It is an object of the present invention, to provide optical variable images wherein three-dimensional objects such as hemi-spheres, cones and the like form images of security devices, labels and the like, using magnetically alignable flakes in the presence of particular magnetic fields, not heretofore described.

SUMMARY OF THE INVENTION

The present invention provides articles, methods and apparatus related to images having an illusive optical effect.

In accordance with the invention there is provided, a security device comprising an image having a first plurality of magnetically alignable flakes resting upon a substrate in a first pattern so as to define a ring or curve. Preferably, at least n flakes, n>1000 are provided, and wherein planes extending from surfaces of the flakes intersect with one another.

In accordance with an aspect of the invention the first plurality of magnetically alignable flakes define a plurality of concentric rings of flakes, and the rings of flakes populate a circular-like region; the flakes defining the rings form an increasing or decreasing angle with respect to the substrate from the outermost ring to the inner most ring.

In an aspect of the invention the device may include a second plurality of magnetically alignable flakes resting upon the substrate in a corresponding pattern to the first pattern wherein the flakes are tilted at a same second angle with respect to the substrate, wherein the second angle is different than the first angle and wherein planes extending from along surfaces of the second plurality of flakes intersect with each other.

The plurality of magnetically alignable flakes may be distributed substantially throughout an entire closed region and oriented in a predetermined pattern therein, wherein at least more than 50% of the flakes are oriented such that lines normal to their reflecting surfaces converge along a line or to a point.

In preferred embodiments the image comprises at least 10,000 flakes or more.

In accordance with an aspect of the invention an optically illusive image is provided comprising a substrate having a region of flakes coating a surface thereof, wherein the flakes are distributed throughout substantially the entire region and oriented in a predetermined pattern therein, wherein the flakes are oriented such that lines normal to their reflecting surfaces converge along a line or to a point.

In accordance with another aspect of the invention a label or security device is provided comprising an optically illusive image having flakes covering and distributed throughout an entire region and oriented in a predetermined pattern, the flakes having reflecting surfaces, wherein the orientation of the flakes forming the predetermined pattern is such that lines normal to the reflecting surfaces of the flakes converge along a line or at a point, wherein the predetermined pattern has an axis of revolution.

In accordance with a further aspect of the invention a printed array is provided comprising a plurality of concentric rings of magnetically aligned platelets disposed upon a substrate in the form of a Fresnel structure, preferably a Fresnel reflector. Advantageously, since the magnetic field can be controlled with respect to strength and direction, one can easily design a field that will correct for spherical aberration that would otherwise be present in a typical Fresnel reflector.

In accordance with an aspect of the invention the image forms a part of a receiving or reflecting antenna and wherein the flakes are selectively absorbing or reflecting, respectively.

In accordance with another aspect of the invention an optical image as described in any of the embodiments described heretofore has a grating thereon and/or the flakes have a surface area between 100 $\mu m^2$ to 1 $mm^2$ and wherein the flakes are within a range of thickness between 100 nm and 100 $\mu m$.

In accordance with yet another aspect of the invention, at least some of the flakes having gratings therein or thereon, and wherein the frequency and depth of the grating is sufficiently low so as to not have diffractive effects that can be seen by the naked human eye, and wherein the flakes having gratings are aligned along lines of the respective grating. In some embodiments at least some of the flakes having gratings therein or thereon, and wherein the frequency of the gratings is less than 200 ln/mm and wherein the depth of the grating is less than 100 microns.

The flakes may be uniform in shape, and are preferably hexagonal in shape allowing for a greater packing density.

In an alternative embodiment of the invention an image is provided that forms a light detector, the image being dynamic such that it displays a number of rings corresponding to a number of separate light sources that illuminate the image.

BRIEF DESCRIPTION OF THE DRAWINGS

Exemplary embodiments of the invention will now be described in accordance with the invention in which:

FIGS. 28A and 28B are photographs of hemispherical convex mirrors.

FIG. 29 is a view of the axial-symmetric alignment of magnetic particles, dispersed in the layer of the ink, along lines of an applied hemisphere-shaped magnetic field forming a printed non-compensated convex Fresnel reflector.

FIGS. 34A, 34B, and 34C are photographs of the prints with hemisphere-shaped alignment.

FIG. 35 is a plan view of the axial-symmetric concave-shaped alignment of diffractive magnetic particles dispersed in a layer of the ink, similar in many respects to FIG. 29.

FIG. 41 is a view of a structure of $MgF_2/Al/Ni/Al/MgF_2$ multi-layered magnetic microstructured pigment.

FIGS. 42a and 42b are graphs depicting multi-angle color travel of low-modulated low-frequency rectangular grating (1) and high-frequency sinusoidal grating (2) at measurement directions across the grooves.

DETAILED DESCRIPTION

The present invention in its various embodiments provides novel and inventive magnetic structures useful for security and packaging and labeling applications. Normally, particles of an optically variable pigment dispersed in a liquid paint or ink vehicle generally orient themselves parallel to the surface when printed or painted on to a surface. Orientation parallel to the surface provides high reflectance of incident light from the coated surface. Magnetic flakes can be tilted with respect to the substrate while in the liquid medium by applying a magnetic field. The flakes generally align in such way that the longest diagonal of a reflective flake and the groove's orientation of the diffractive flake follows a magnetic field line. Depending on the position and strength of the magnet, the magnetic field lines can penetrate the substrate at different angles, tilting magnetic flakes to these angles. A tilted flake reflects incident light differently than a flake parallel to the surface of the printed substrate. The reflectance and hue can both be different. Tilted flakes typically look darker and have a different colour than flakes parallel to the surface at a normal viewing angle.

Examples of Printed Illusive Images

Figure 1A:
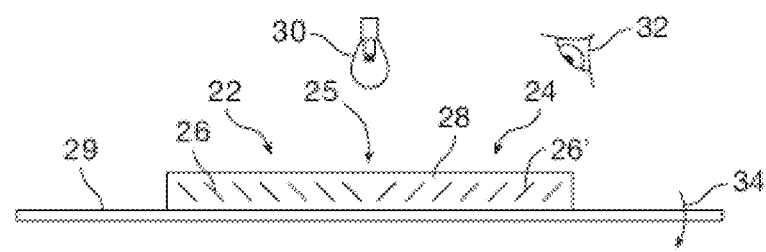
FIG. 1A is a simplified cross section of a printed image that will be referred to as a "flip-flop" described and illustrated in the applicants' United States Patent application US2005/0106367 A1.

FIG. 1A is a simplified cross section of a printed image 20 that will be referred to as a "switching" optical effect, or "flip-flop", for purposes of discussion, according to an embodiment of the present invention. The flip-flop includes a first printed portion 22 and a second printed portion 24, separated by a transition 25. Pigment flakes 26 surrounded by carrier 28, such as an ink vehicle or a paint vehicle have been aligned parallel to a first plane in the first portion, and pigment flakes 26' in the second portion have been aligned parallel to a second plane. The flakes are shown as short lines in the cross-sectional view. The flakes are magnetic flakes, i.e. pigment flakes that can be aligned using a magnetic field. They might or might not retain remnant magnetization. Not all flakes in each portion are precisely parallel to each other or the respective plane of alignment, but the overall effect is essentially as illustrated. The Figures are not drawn to scale. A typical flake might be twenty microns across and about one micron thick, hence the Figures are merely illustrative. The image is printed or painted on a substrate 29, such as paper, plastic film, laminate, card stock, or other surface. For convenience of discussion, the term "printed" will be used to generally describe the application of pigments in a carrier to a surface, which may include other techniques, including techniques others might refer to as "painting".

Generally, flakes viewed normal to the plane of the flake appear bright, while flakes viewed along the edge of the plane appear dark. For example, light from an illumination source 30 is reflected off the flakes in the first region to the viewer 32. If the image is tilted in the direction indicated by the arrow 34, the flakes in the first region 22 will be viewed on-end, while light will be reflected off the flakes in the second region 24. Thus, in the first viewing position the first region will appear light and the second region will appear dark, while in the second viewing position the fields will flip-flop, the first region becoming dark and the second region becoming light. This provides a very striking visual effect. Similarly, if the pigment flakes are colour-shifting, one portion may appear to be a first colour and the other portion another colour.

The carrier is typically transparent, either clear or tinted, and the flakes are typically fairly reflective. For example, the carrier could be tinted green and the flakes could include a metallic layer, such as a thin film of aluminum, gold, nickel, platinum, or metal alloy, or be a metal flake, such as a nickel or alloy flake. The light reflected off a metal layer through the green-tinted carrier might appear bright green, while another portion with flakes viewed on end might appear dark green or other colour. If the flakes are merely metallic flakes in a clear carrier, then one portion of the image might appear bright metallic, while another appears dark. Alternatively, the metallic flakes might be coated with a tinted layer, or the flakes might include an optical interference structure, such as an absorber-spacer-reflector Fabry-Perot type structure. Furthermore, a diffractive structure may be formed on the reflective surface for providing an enhancement and an additional security feature. The diffractive structure may have a simple linear grating formed in the reflective surface, or may have a more complex predetermined pattern that can only be discerned when magnified but having an overall effect when viewing. By providing diffractive reflective layer, a colour change or brightness change is seen by a viewer by simply turning the sheet, banknote, or structure having the diffractive flakes.

The process of fabricating diffractive flakes is described in detail in U.S. Pat. No. 6,692,830. U.S. patent application 20030190473, describes fabricating chromatic diffractive flakes. Producing a magnetic diffractive flake is similar to producing a diffractive flake, however one of the layers is required to be magnetic. In fact, the magnetic layer can be disguised by way of being sandwiched between Al layers; in this manner the magnetic layer and then it doesn't substantially affect the optical design of the flake; or could simultaneously play an optically active role as absorber, dielectric or reflector in a thin film interference optical design.

Figure 1B:
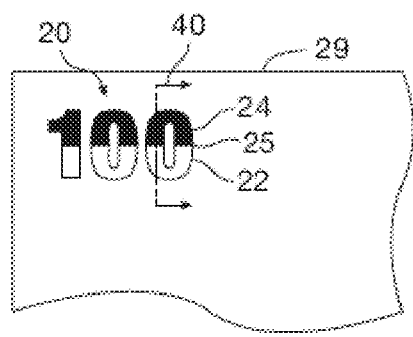
FIG. 1B is a simplified plan view of the printed image on a document at a first selected viewing angle described and illustrated in the applicants' United States Patent application US2005/0106367 A1.

FIG. 1B is a simplified plan view of the printed image 20 on the substrate 29, which could be a document, such as a bank note or stock certificate, at a first selected viewing angle. The printed image can act as a security and/or authentication feature because the illusive image will not photocopy and cannot be produced using conventional printing techniques. The first portion 22 appears bright and the second portion 24 appears dark. The section line 40 indicates the cross section shown in FIG. 1A. The transition 25 between the first and second portions is relatively sharp. The document could be a bank note, stock certificate, or other high-value printed material, for example.

Figure 1C:
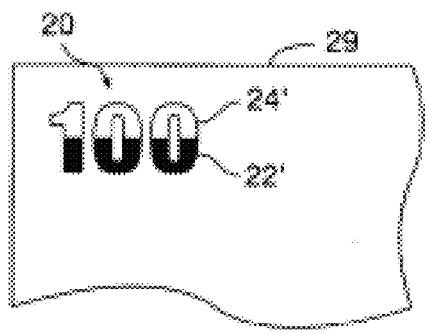
FIG. 1C is a simplified plan view of the printed image at a second selected viewing angle, obtained by tilting the image relative to the point of view described and illustrated in the applicants' United States Patent application US2005/0106367 A1.

FIG. 1C is a simplified plan view of the printed image 20 on the substrate 29 at a second selected viewing angle, obtained by tilting the image relative to the point of view. The first portion 22 now appears dark, while the second portion 24 appears light. The tilt angle at which the image flip-flops depend on the angle between the alignment planes of the flakes in the different portions of the image. In one sample, the image flipped from light to dark when tilted through about 15 degrees.

Figure 2A:
FIG. 2A is a simplified cross section of a printed image that will be referred to as a "rolling bar" for purposes of discussion, described and illustrated in the applicants' United States Patent application US2005/0106367 A1.

FIG. 2A is a simplified cross section of a printed image 42 of a kinematic optical device that will be defined as a micro-arrayed cylindrical Fresnel reflector or as referred to as a "rolling bar" for purposes of discussion, according to another embodiment of the present invention. The image includes pigment flakes 26 surrounded by a transparent carrier 28 printed on a substrate 29. The pigment flakes are aligned in a curving fashion. As with the flip-flop, the region(s) of the rolling bar that reflect light off the faces of the pigment flakes to the viewer appear lighter than areas that do not directly reflect the light to the viewer. This image provides a Fresnel focal line that looks very much like a light band(s) or bar(s) that appear to move ("roll") across the image when the image is tilted with respect to the viewing angle (assuming a fixed illumination source(s).

Figure 2B:
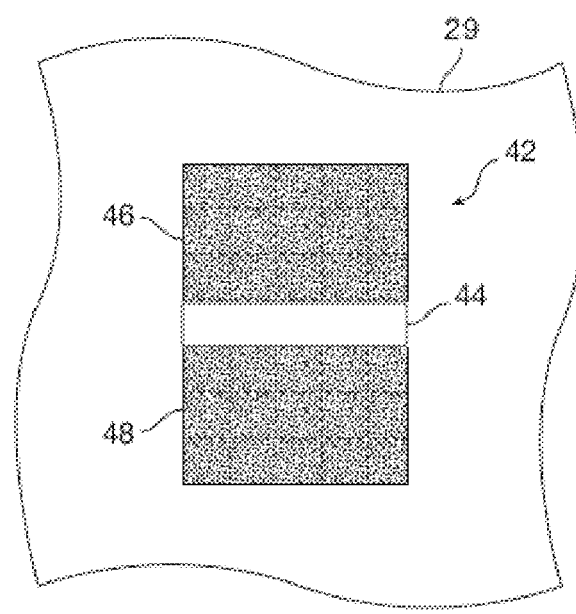
FIG. 2B is a simplified plan view of the rolling bar image at a first selected viewing angle described and illustrated in the applicants' United States Patent application US2005/0106367 A1.
Figure 2C:
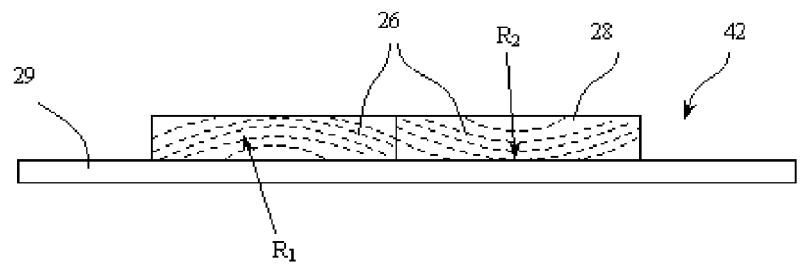
FIG. 2C is a simplified cross section of a printed image that will be referred to as a "double rolling bar" for purposes of discussion, described and illustrated in the applicants' United States Patent application US2005/0106367 A1.

FIG. 2B is a simplified plan view of the rolling bar image 42 at a first selected viewing angle. A bright bar 44 appears in a first position in the image between two contrasting fields 46, 48. FIG. 2C is a simplified plan view of the rolling bar image at a second selected viewing angle. The bright bar 44' appears to have "moved" to a second position in the image, and the sizes of the contrasting fields 46', 48' have changed. The alignment of the pigment flakes creates the illusion of a bar "rolling" down the image as the image is tilted (at a fixed viewing angle and fixed illumination). Tilting the image in the other direction makes the bar appear to roll in the opposite direction (up).

The bar may also appear to have depth, even though it is printed in a plane. The virtual depth can appear to be much greater than the physical thickness of the printed image. It happens because the bar is a imaginary focal line of the cylindrical convex Fresnel reflector located at the focal length underneath the plane of the reflector. The tilting of the flakes in a selected pattern reflects light to provide the illusion of depth or "3D", as it is commonly referred to. A three-dimensional effect can be obtained by placing a shaped magnet behind the paper or other substrate with magnetic pigment flakes printed on the substrate in a fluid carrier. The flakes align along magnetic field lines and create the 3D image after setting (e.g. drying or curing) the carrier. The image often appears to move as it is tilted; hence kinematic 3D images may be formed.

Flip-flops and rolling bars can be printed with magnetic pigment flakes, i.e. pigment flakes that can be aligned using a magnetic field. A printed flip-flop type image provides an optically variable device with two distinct fields that can be obtained with a single print step and using a single ink formulation. A rolling bar type image provides an optically variable device that has a contrasting band that appears to move as the image is tilted, similar to the semi-precious stone known as Tiger's Eye. These printed images are quite noticeable and the illusive aspects would not photocopy. Such images may be applied to bank notes, stock certificates, software documentation, security seals, and similar objects as authentication and/or anti-counterfeiting devices. They are particularly desirable for high-volume printed documents, such as bank notes, packaging, and labels, because they can be printed in a high-speed printing operation, as is described below.

Figure 2D:
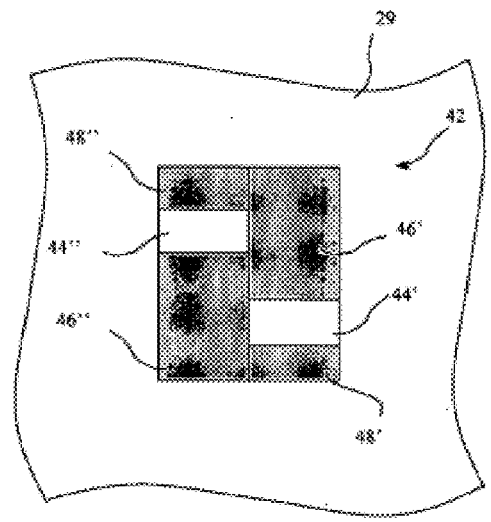
FIG. 2D is a top view of the image shown in FIG. 2C.

In another embodiment, shown in FIGS. 2C and 2D a "double rolling bar" is an image wherein one portion 44' has magnetic flakes oriented in cylindrical convex fashion while another portion 44" of the image has magnetic flakes oriented in a cylindrical concave orientation. To achieve this convex orientation, the "rolling bar" magnet is placed underneath the paper substrate. For the concave orientation, the magnet is placed above the paper substrate. A "Double tilt" image is formed when magnetic flakes in two regions of the image have differing and opposing orientation, for example, +30 degrees and −30 degrees. At one tilted position of the printed image one part of the image is dark and another part is light. When printed image is tilted in an opposing direction, the areas switch their light and dark regions so that the first image becomes light and the second image becomes dark. Depending upon the intended design, this switch of the light and dark may occur from the top to the bottom and back, as well as from the left to the right and back, in dependence upon the on orientation of the flakes. In FIGS. 2C and 2D the bright bar 44' appears to have "moved" to a second position in the image, and the sizes of the contrasting fields 46', 48' have changed; furthermore the bright bar 44" appears to have "moved" to a different position in the image, and the sizes of the contrasting fields 46", 48" have changed.

This invention applies three-dimensional magnetic fields having a predetermined shape, for a linear or discrete printing of dynamic optical devices (DACOD). Dynamic optical devices are images, some of which may be printed with a high-speed printing press, and which use ink containing magnetic platelet-like pigments in a magnetic field having a predetermined shape. The images are able to change their appearance in response to a physical action applied by an observer to the substrate. The observer needs to tilt, rotate or bend the substrate to see appearance or disappearance or motion of parts of the image or entire image. This behavior of the Dynamic Appearance-Changing Optical Devices (DACOD) depends purely on reflection or dispersion of the incident light from differently oriented magnetic platelets in the layer of dry ink. The presence or absence of colour is a complementary feature of the DACODs. Magnetic colour-shifting pigments provide a plurality of variations in the colour change of dynamic optical devices in addition to their appearance change.

This invention describes a special class of dynamic optical devices in part of an image printed through a silk screen, offset, flexo, intaglio, gravure or other known printing methods on a paper or other flat substrate material in magnetic fields of different configurations in such a way that during translation of the printed wet image on the substrate in the field, the platelets of the pigment in the layer of the ink align along magnetic lines of the field causing the images to change their appearance in observations at different angles after drying of the ink. The printed image that has an appearance-changing element does not need any special equipment to be viewed and therefore it can be viewed by the naked eye. Tilt of the printed dynamic optical device at different angles with respect to the light source causes attention-grabbing change of appearance or motion in the part of the image that was printed with magnetic ink. The ink for the dynamic optical devices consists of an ink vehicle and any light reflecting or light dispersing platelet-based magnetic pigment. The pigment can be a colour-shifting pigment, a non colour-shifting pigment, and/or or have a microstructure such as a diffraction grating facilitating orientation of the magnetically aligned flake. The ink vehicle may be clear or coloured, UV curable or solvent based.

Printed appearance-changing optical devices may be used as a security feature on or within bank notes and valuable documents.

Effects of apparent motion or change within an image are well known in the printing industry. Usually they based on a specific picture or set of patterns for motion effects or lenticular substrates for the image change with the flip effect. The number of known effects is limited which greatly limits their applicability.

Appearance-changing images, printed in magnetic fields, have been described heretofore in the applicants' earlier published United States patent application US 2004/0051297 A1. Described therein are printed images with a rolling bar effect and a flip-flop effect changing colour or intensity of the reflected light in different parts of the image as the light source or viewing angle changes. Change in the image appearance in these effects doesn't happen instantly as for holograms or lenticular substrates but rather gradually.

Notwithstanding, the images described in the aforementioned '297 U.S. patent application are related to simple rolling bar and flip-flop type applications, wherein flakes along a single straight lines are symmetrical, and make a same angle with the substrate; and flakes along subsequent adjacent straight lines make a different same angle with the substrate, so that each flake in any given row of flakes has a same angle with the substrate, and wherein flakes in adjacent rows typically form a different angle with the substrate.

We have recently discovered that by aligning flakes along curves, wherein flakes along any given curve forms a same angle with the substrate, and wherein flakes following adjacent curves more especially circles, particularly concentric circles are oriented to form a different angle than an adjacent curve or circle, striking realistic optically illusive images of objects such as funnels, cones, bowls, and ellipses, and hemispheres can be formed. It should be noted that in particular embodiments the circles may be more elliptical than circular and the definition of circle hereafter includes circular-like rings and shapes.

The description which follows refers to a significantly different class of printed optical effects similar in reflection of incident light by reflective cones, spheres, hemispheres, funnels, and various other three-dimensional objects and in particular, Fresnel-like structures.

Figure 3:
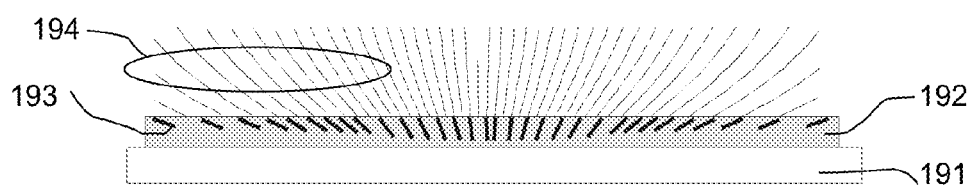
FIG. 3 is a cross section of magnetically aligned platelets in a layer of printed dry ink corresponding to the star burst image shown in FIG. 4.
Figure 4:
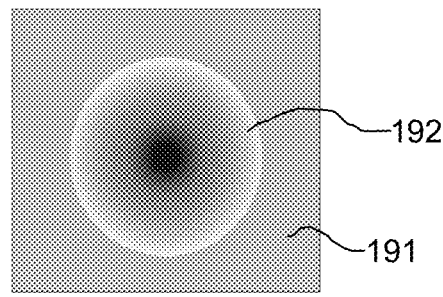
FIG. 4 is a plan view of an image of a star burst pattern in accordance with this invention.
Figure 5A:
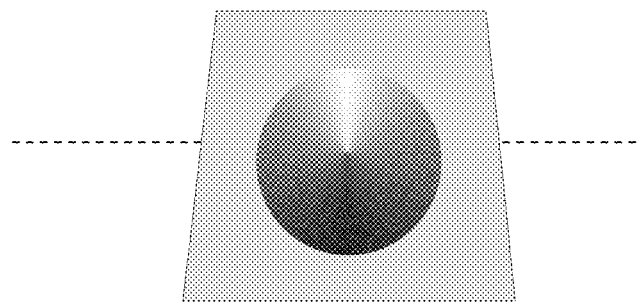
FIGS. 5A and 5B are photographs of images of cones comprised of magnetically aligned platelets.
Figure 5B:
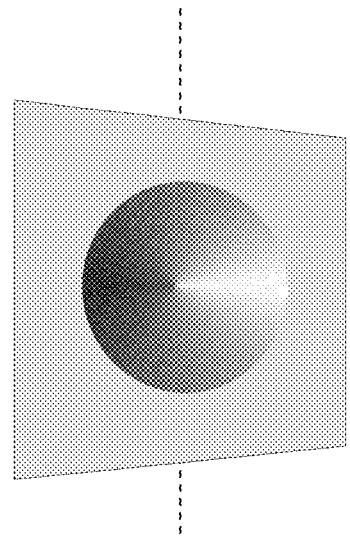
Figure 20:
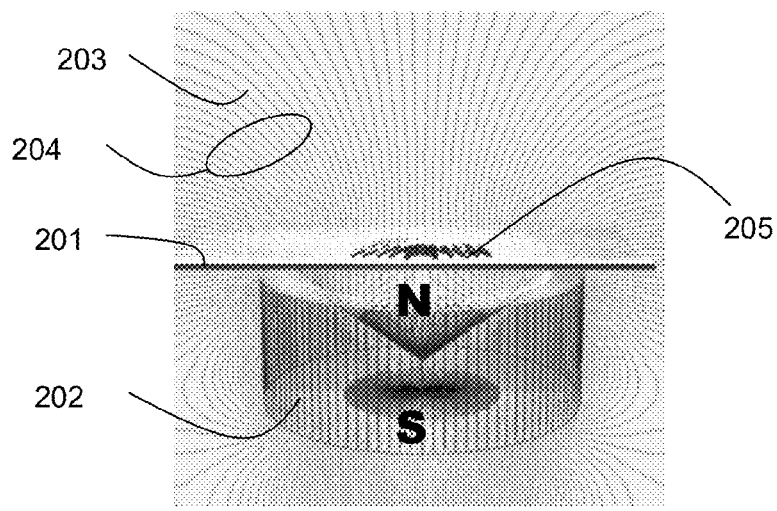
FIG. 20 is a view of the cone-shaped alignment of magnetic particles in the cone-shaped magnetic field when the funnel-shaped magnet is located underneath the substrate.
Figure 20A:
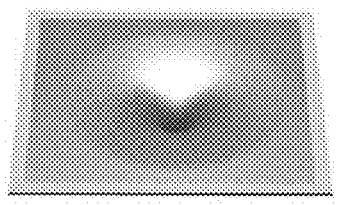
FIG. 20A is a photograph of an image of a funnel shaped object in accordance with this invention.

Examples are shown, wherein, FIG. 4 is an image that has a dynamic effect in the form of a "star-burst" pattern; and, wherein an image of a cone is shown in FIG. 5A, and an image of a funnel is shown in FIG. 20A. The print with the "star burst" image was made using a funnel-shaped magnetic field. The cross-section of the platelets' orientation in the layer of printed dry ink is illustrated in FIG. 3. The ink 192 with dispersed magnetic particles 193 is printed on the top of a substrate 191 by one of the printing methods described heretofore. Magnetic lines 194 are oriented perpendicularly to the substrate in the center of the image. The magnetic field lines decline with an increase in radial distance from the center; therefore, the field is strongest in the centre and weakens with distance away from the centre, radially outward.

The center of the printed optical device printed in the funnel-shaped field, shown in FIG. 4 is dark at a normal angle of observation. The lightness of the printed image increases gradually from the center out to the edges. When the printed image is tilted horizontally with its upper edge away from the observer, the dark area appears to move toward the bottom. Vertically tilting the image to the right appears to move the shaded part of the image in the direction opposite to the tilt.

Figure 6:
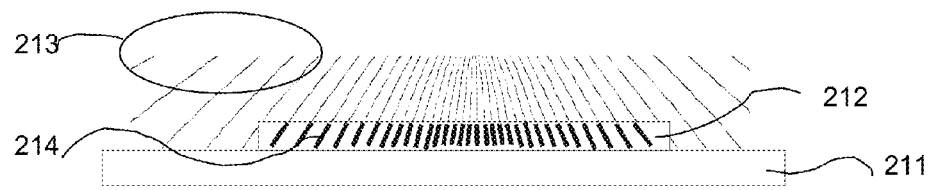
FIG. 6 is a cross-section of a cone shaped magnetic field illustrating platelets aligned in the field.

The cone-shaped magnetic field lines, shown in FIG. 6, align the magnetic platelets in an opposite order to that of the funnel-shaped field. As a result of such orientation, the movement in the image is in the direction opposite to the direction of the images produced in the funnel-shaped image. The flakes 214, dispersed in the ink 212 and printed on the substrate 211, follow the magnetic lines 213 and are tilted with their tops in the direction of the center of the field.

Figure 7:
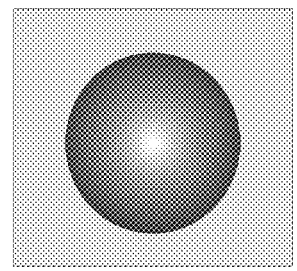
FIG. 7 is a photograph of an image of a cone as observed directly from above at an angle normal to the surface of the image.
Figure 7A:
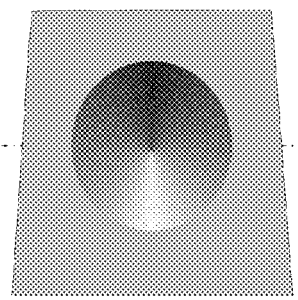
FIGS. 7A and 7B are photographs of images of cones observed from different angles.
Figure 7B:
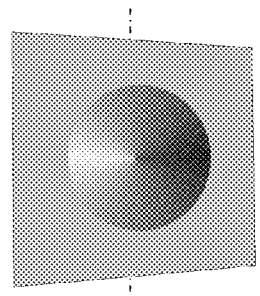

The print, made in the cone-shaped field, produces an image with a bright center at a normal angle of observation as shown in FIG. 7. When the print is tilted with its upper edge away from the observer the bright region shifts to the bottom as shown in FIG. 7A in contrast to the image in FIG. 5A. Vertical tilt to the right is illustrated in FIG. 7B which causes a shift of the bright area to the left.

Figure 8:
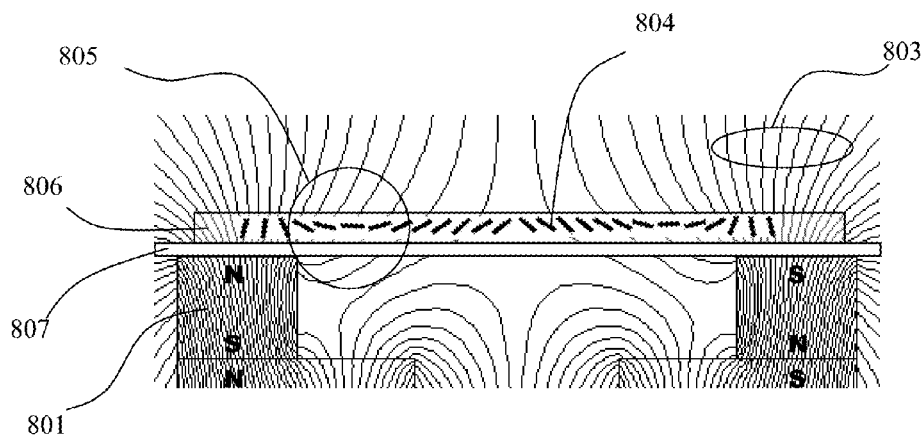
FIG. 8 is a cross-sectional view of an alternative embodiment of the invention wherein two ring-shaped stacked magnets of different radii are used producing a novel magnetic field that has very surprising effects in the printed image.
Figure 9:
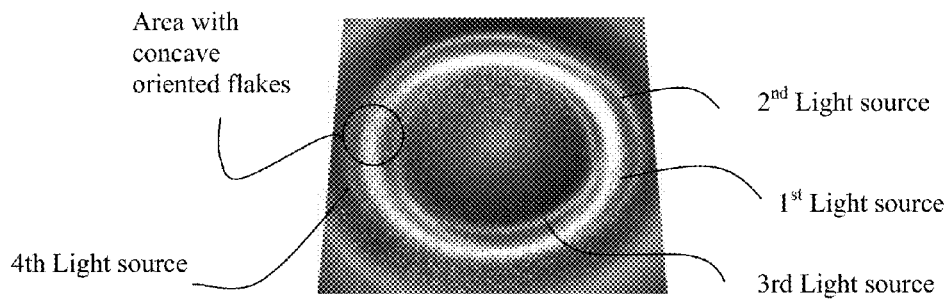
FIG. 9 is a photograph of an image produced with the magnetic arrangement in FIG. 8.

Images printed in a torus-shaped field or a shape approximate to that generates images with an appearance shown in FIG. 9. The cross-section of the particles position aligned in the torus-shaped field is shown in FIG. 8. The ink 232 with dispersed magnetic particles 232 is printed on the substrate 231.

The described above methods for aligning magnetically alignable flakes or particles can be applied to the images where either entire area is printed wherein the magnetic feature or just a certain part of the image is filled with magnetic feature. This depends upon the desired image.

Many of the magnetic features described above can be applied to images printed with guilloche patterns for enhancement of security features of bank notes and other valuable documents.

Referring now to FIGS. 8 and 9, a novel, inventive and very surprising effect is created by using stacked magnets 801 and 802 to form a toroidal parabolic reflector were two ring-shaped magnets of different radii are stacked on the top of each other. The resulting magnetic field illustrated in part by lines 803 is very different than using a single magnet. Magnetic lines near corners of the top magnet are bent down under influence of lower magnet. As a result, magnetic particles 804 nearby the corners of the upper magnet appear to be in the area of the field where the field intensity is large enough to provide precise concave particles alignment along the lines of applied magnetic field. The flakes 805 are shown to be concave oriented intermediate the outside edge and the centre. The flakes are dispersed in an ink 806 on a substrate 807. If the magnets are ring-shaped, as shown in this figure, resulting printed image looks like a bright ring under a single light source. Under skylight it is a wide blue ring. Under illumination of several light sources the print looks like a set of rings equal in quantity to the number of surrounding light sources as shown in the photograph in FIG. 9. This embodiment functions as a light detector, wherein the image shows the viewer a number of rings corresponding to the number of physically separate light sources that are reflected from the image. That is, for example if three light sources illuminate the image, three separate rings are visible, if n light sources are illuminate the image, n rings are visible, n being a positive integer.

It should be noted that the thickness, dimensions, and strength of the magnets can vary depending upon the particular desired image. For example the stacked magnets may be of same thickness and strength, having different diameters, or alternatively one or more parameters may be varied.

Many of the magnetic features described heretofore can be applied to the images printed with geometrical images and illusive optical images for enhancement of their illusive properties. Examples of such images are shown in FIGS. 10A 10B, 11, 12, and 13A. The spiral linear image of FIG. 10A, printed in the presence of a torus-shaped field, has an appearance shown in FIG. 10B.

Figure 10A:
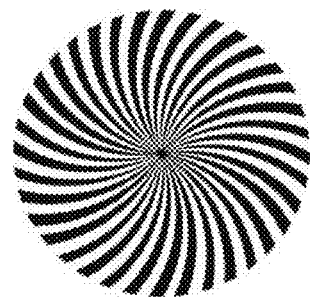
FIGS. 10A, 10B, 10C, 11, 12 and 13A are images of ink containing magnetic particles applied in various different patterns subsequently having magnetic platelets therein aligned by using a torus-like magnetic field.
Figure 10B:
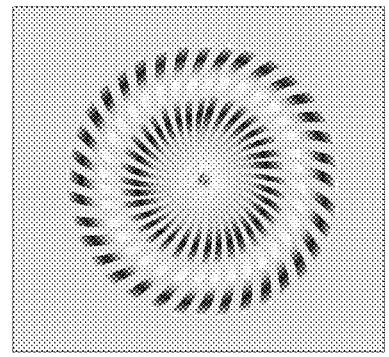
Figure 10C:
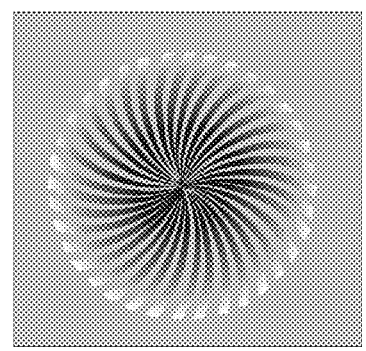
Figure 11:
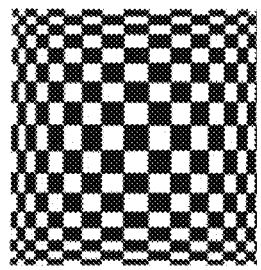
Figure 12:
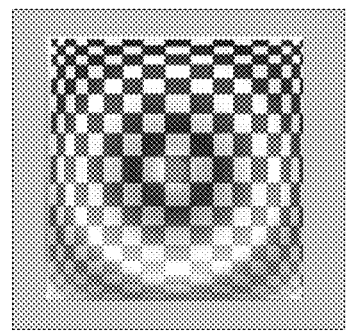

The same spiral-like image in FIG. 10A, when printed with the funnel-shaped field, has an appearance (FIG. 10C) that is very different from the image shown in FIG. 10B. The illusive image shown in FIG. 11 has a different appearance shown in FIG. 12 after printing in an applied torus-shaped field. The torus-shaped magnetic filed creates the illusion of a ripple in the image.

Figure 13A:
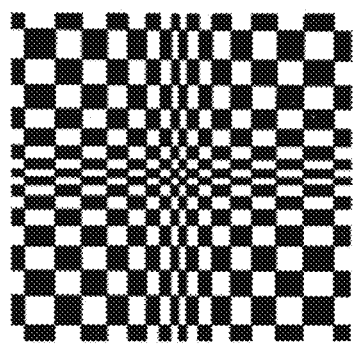
Figure 13B:
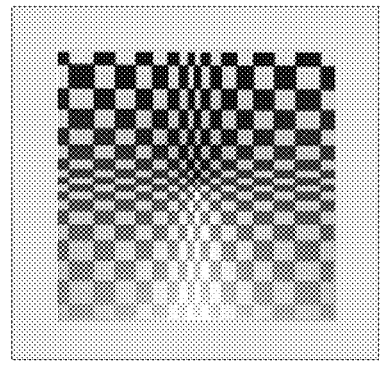
FIG. 13B is a photograph of an optically illusive image in accordance with this invention.

Another linear illusive image is shown in FIG. 13B wherein printing is performed in the cone-shaped field enhancing the optical illusive features in FIG. 13B.

The images shown in FIGS. 3 through 13B share radial symmetry. In each of the images, flakes are aligned in rings wherein flakes along a given ring form a same angle with the substrate upon which their edge rests and adjacent rings have flakes forming different angles with the substrate. Furthermore flakes in a given ring, have planar surfaces which intersect the plane of an adjacent flake. This is clearly seen in FIG. 14.

Figure 14:
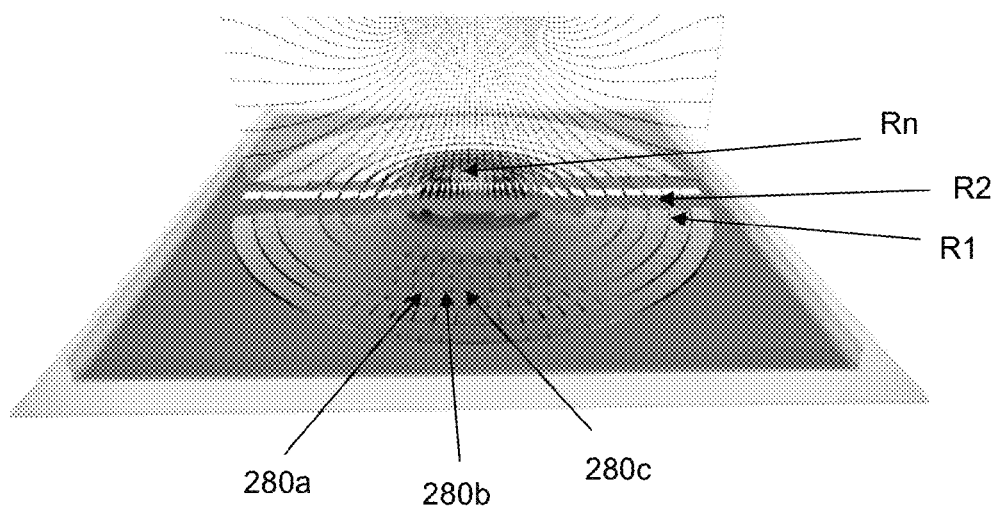
FIG. 14 is an illustration depicting the flake arrangement in the image of the cone shown in FIG. 7A; larger fewer symmetrical flakes were used for illustrative purposes and some flakes are purposefully omitted to show side views of particular flakes.

Turning now to FIG. 14 (not to scale, wherein large flakes are used for illustrative purposes) a computer drawing is shown of the flake arrangement in the image of the cone, shown for example, in FIG. 7A. Although all of the flakes are shown resting on a common planar substrate, each ring of flakes R1, R2 to Rn has flakes along that ring which make a unique same angle with the planar substrate. As can be seen from FIG. 14, the flakes in the outer ring R1, are all tilted a same angle with respect to the substrate, and the flakes within ring R2 make a slightly steeper same angle with the substrate, thus, the angle increases as one moves from ring R1, to R2, to Rn. Because the flakes that follow any given ring, i.e. R1, all lie on a circle of a particular diameter, and because the flakes have planar faces; by definition, the planes defining their faces intersect with their closest neighboring flakes on lying on the same circle. For example flakes 280a and 280b have flat planar faces, wherein the planes intersect. Although all of the flakes contact the substrate, the image of the cone leaves the viewer with the illusion that that cone projects out of the paper or substrate it is deposited on.

Figure 15:
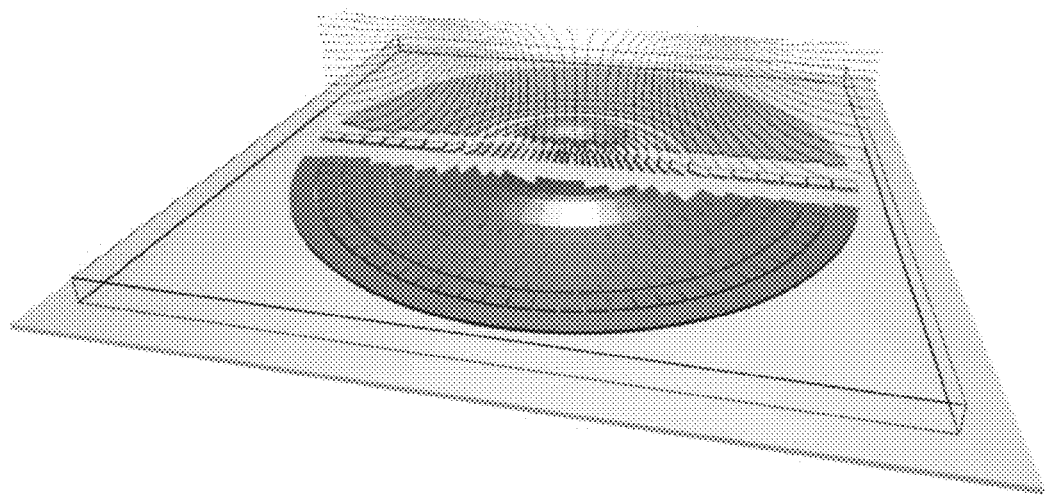
FIG. 15 is a similar illustration to FIG. 14, shown in perspective view.

Referring now to FIG. 15, an illustration of the same cone of FIG. 14 is shown wherein a cross-section through the middle of the structure is shown in an otherwise perspective view to illustrate the flake alignment. Here the orientation of the flakes, or tilt with respect to the substrate is shown to follow the field lines, created by a magnet (not shown) beneath the substrate. For the purposes of clarity and better understanding the flakes are shown to be substantially square, but in practice, the shapes of the flakes are likely to vary greatly unless flakes of a square or hexagon or other specific shape are used.

Figure 16:
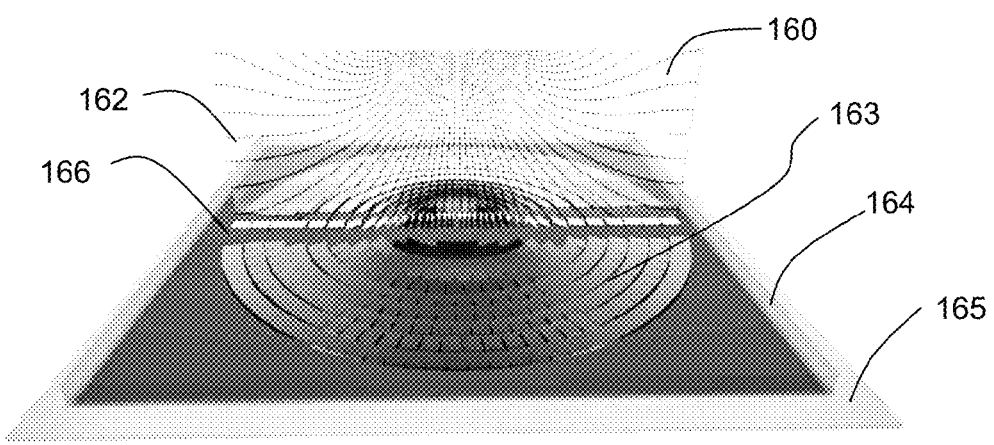
FIG. 16 is a view similar to FIG. 15, of the axial-centric alignment of non-structured magnetic platelets, dispersed in the layer of the ink, along lines of applied cone-shaped magnetic field.

Referring now to FIG. 16, the axial-symmetric cone-shaped alignment of magnetic particles dispersed in thin layer of the ink is shown. The cross section of a magnetic field 160 is illustrated with field lines 162, but in reality, these lines form sheets of lines along which the flakes become oriented. Magnetically orientable flakes 163 are shown disposed in concentric rings within an ink medium 164, wherein flakes disposed in each of the rings following the field lines forms a different angle with the substrate 165 wherein the angle increases toward the centre. The gap 166 in the drawing is for illustrative purposes only so that the angle of the flakes with respect to the substrate can be more readily be seen.

Figure 17:
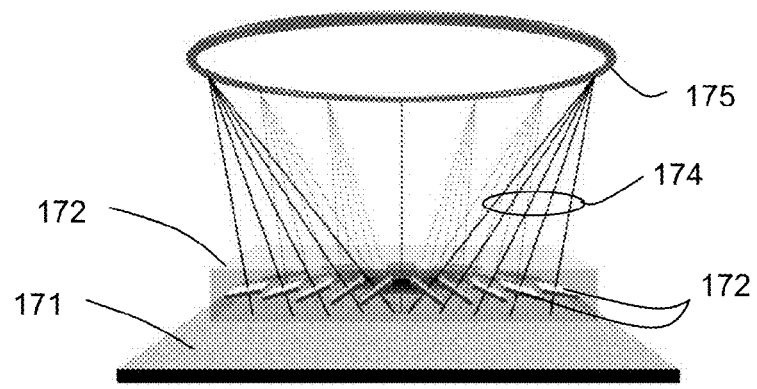
FIG. 17 is an illustration of a cone-shaped alignment of magnetic particles, dispersed in a vehicle or carrier of a thin layer of ink, wherein angles normal to the particles surfaces are shown to converge above the image along a curve defining an imaginary ring.
Figure 18A:
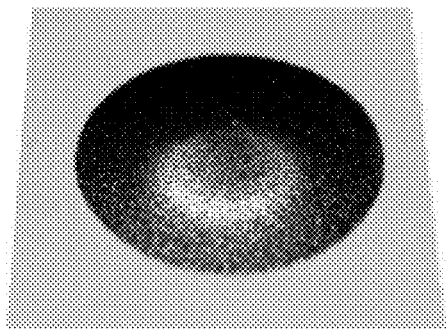
FIGS. 18A and 18B are photographs of the prints with cone-shaped alignment showing reflective rings.
Figure 18B:
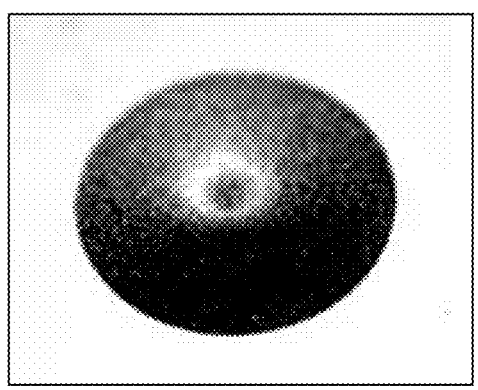

Turning now to FIG. 17 the cone-shaped alignment of magnetic particles 173, dispersed in thin layer of ink vehicle 172, supported on a sheet 171 is shown. Lines 174 normal to the particles surfaces are drawn for illustrative purposes only, to show the relationship of angles normal (hereafter referred to as "normals") to the surface of the flakes, wherein the lines normal to the surfaces converge at points defining an imaginary oval area 175 where the normals converge.

Figure 19:
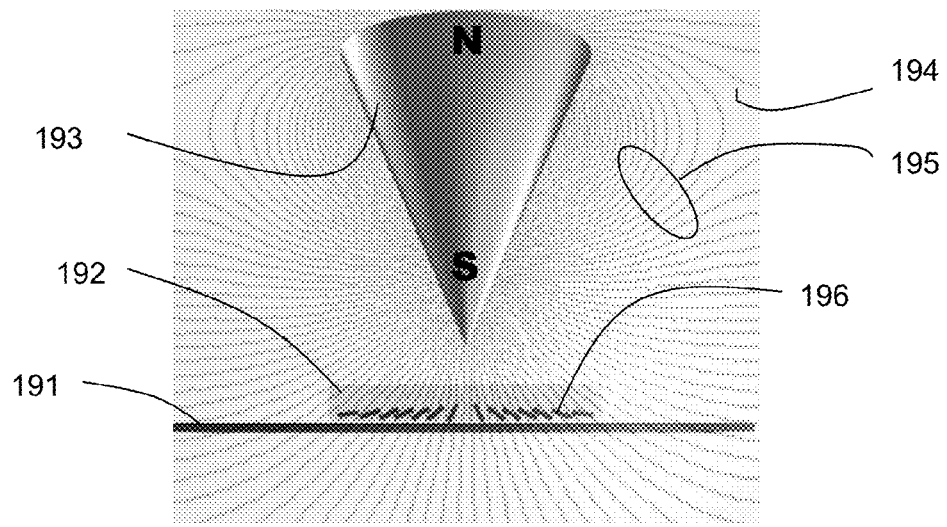
FIG. 19 is a drawing illustrating a cone-shaped alignment of magnetic particles in the cone-shaped magnetic field when a cone-shaped magnet is located over the substrate.

Referring now to FIG. 19, a drawing is shown illustrating the cone-shaped alignment of magnetic particles 196 in the cone-shaped magnetic field resulting from disposing a cone-shaped magnet 193 above the top of the substrate. The particles or flakes 196 in an ink 192 are oriented with the magnetic field lines 195. Reference numeral 194 illustrates a cross section of the magnetic field from the conical magnet 193. Once again, the flakes are oriented in concentric circles wherein flakes following each circle or ring form a same angle with the substrate and wherein flakes in different rings form different angles with the substrate.

Figure 21A:
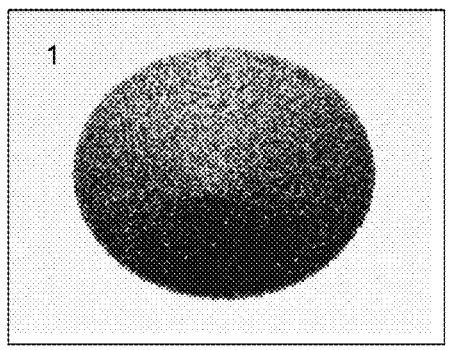
FIGS. 21A and 21B are photographs if the image resulting from the particle alignment shown in FIG. 20.
Figure 21B:
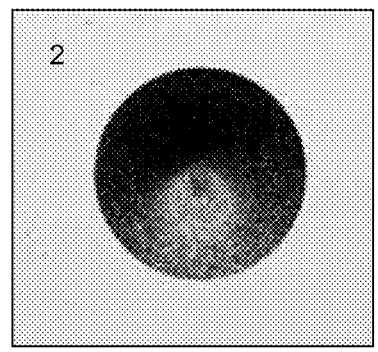

An alternative embodiment is shown in FIG. 20 wherein a cone-shaped alignment of magnetic particles in a cone-shaped magnetic field is provided by disposing a funnel-shaped magnet 202 underneath the substrate 201. Magnetic particles 205 in an ink vehicle (not shown) are printed upon the paper substrate 201. The cross section of the magnetic field is illustrated by reference numeral 203 and magnetic particles 205 follow the magnetic field lines 204. Since the field lines 204 propagate through the entire region of the substrate, ink applied to a circular regions carrying the flakes therewithin become aligned. Thus, the circle of flakes 205 disposed in the magnetic field, once aligned in the field, have the visual effect of viewing a cone shaped object. This is captured by the photographs in FIGS. 21A and 21B which show the cone-shaped print tilted toward the observer 1 and away from the observer 2.

Figure 20B:
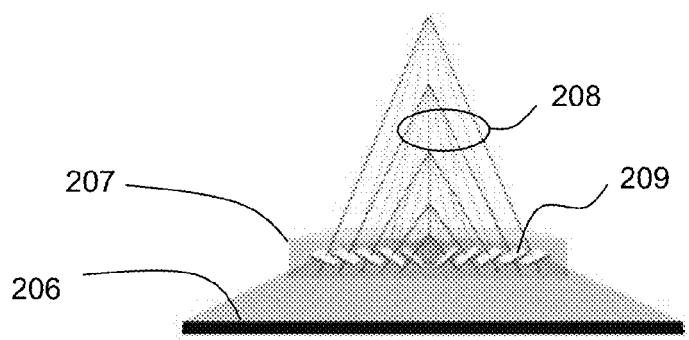
FIG. 20B is a partial cross-sectional view of the funnel-shaped alignment of magnetic platelets dispersed in a vehicle comprising a thin layer of ink with surfaces normal to the particles shown.

FIG. 20B illustrates the funnel-shaped alignment of magnetic platelets 209, dispersed in a vehicle comprising a thin layer of ink 207, with surfaces normal 208 to the particles shown.

Figure 20C:
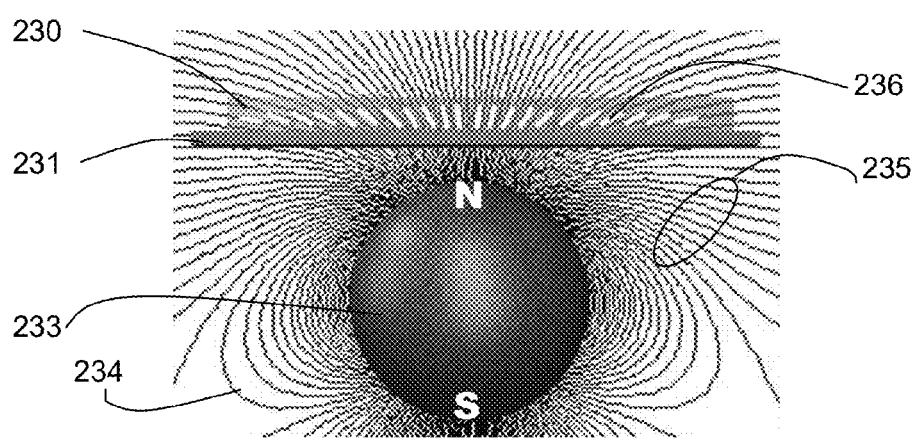
FIG. 20C is a cross-sectional view of the funnel-shaped alignment of magnetic particles in the funnel-shaped magnetic field when the ball-shaped magnet is located underneath the substrate.

FIG. 20C shows an alternative embodiment wherein a funnel shaped alignment of magnetic platelets 236 is provided by a spherical or ball shaped magnet 233, disposed under a paper substrate 231. The platelets 236 following the field lines 235 are disposed in an ink vehicle 230. When the ink is cured the flakes become fixed in the position shown.

Figure 22:
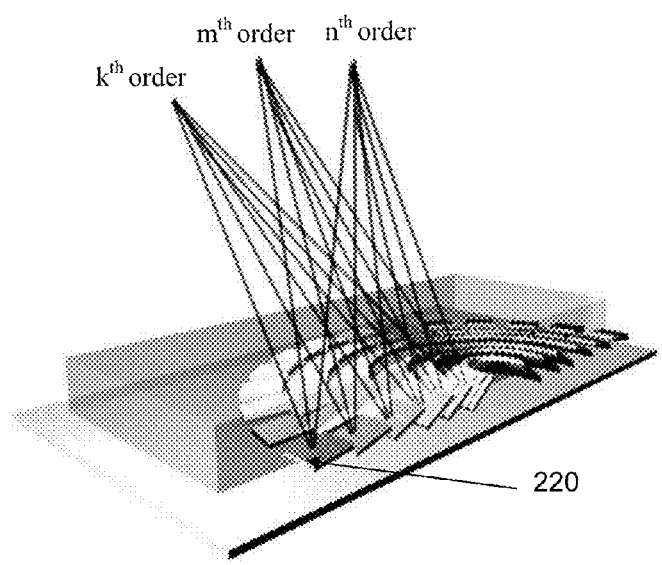
FIG. 22 is a partial cut-away perspective view of the alignment of diffractive magnetic particles in an axial-symmetric cone-shaped magnetic field.

FIG. 22 is a cut away partial view illustrating the alignment of diffractive magnetic particles 220 in an axial-symmetric cone-shaped magnetic field. A preferred orientation of the grooves of the particles is in the direction of the center of the cone. When placed in the magnetic field, diffractive platelets behave as any other magnetic particles; they become oriented along the lines of the applied magnetic field. However, flat magnetic platelets dispersed in a wet ink vehicle align themselves by a longest diagonal in the direction of magnetic lines wherein diffractive platelets 220 align themselves with their grooves defining the diffractive structure or grating along the direction of the magnetic field lines. Axial-symmetric alignment of diffractive particles creates a silver-like region surrounded by a rainbow coloured border or generates different coloured rings in the print.

Figure 23:
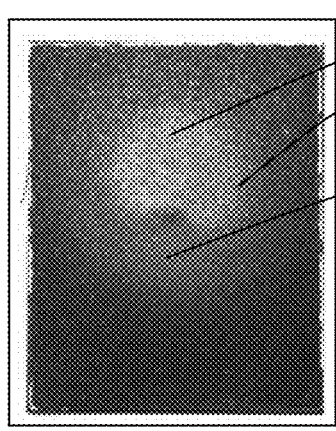
FIGS. 23 and 24 are photographs of the axial-symmetric print containing magnetic diffractive particles and tilted toward the observer.
Figure 24:
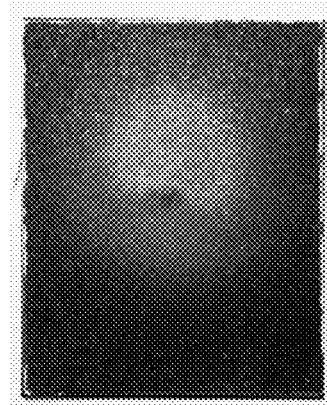

FIGS. 23 and 24 are photographs of the axial-symmetric print containing magnetic diffractive particles and tilted toward the observer.

Figure 25:
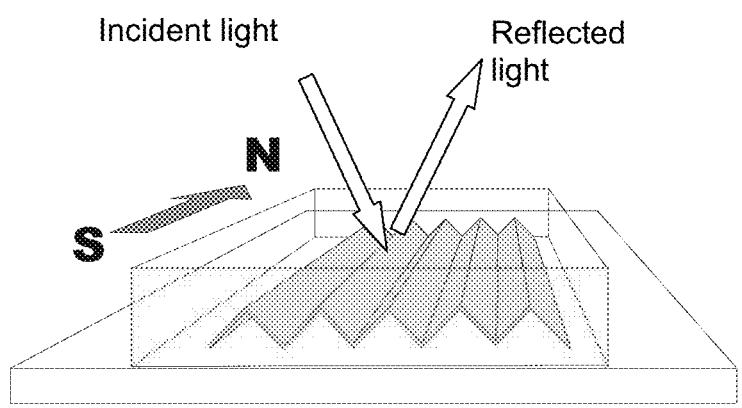
FIG. 25 is a drawing illustrating the orientation of a diffractive flake when placed in a magnetic field wherein the grooves of the flake are shown to align with the magnetic field lines.

As is mentioned above, the flat magnetic platelets, dispersed in a wet ink vehicle on the surface of a substrate, orient themselves along magnetic lines of an applied magnetic field by their largest diagonals. In contrast to the flat platelets, diffractive magnetic platelets orient themselves in the same conditions along magnetic lines by direction of their grooves as shown in the FIG. 25. Each particle reflects and disperses the incident light in only one particular narrow direction. Such selective orientation in the magnetic field and the narrow reflectance and dispersion of the light from the surface of diffractive platelets make possible the fabrication of unique printed images similar to known holographic kinegrams.

Heretofore, embodiments relating to curved or circular arrangements of flakes have been disclosed forming a new class of optical devices. These devices have been characterized by the angular relationship of the flat or diffractive flakes with a substrate they are supported by. Many of these devices form Fresnel structures, such as Fresnel reflectors. For example the conical structures and funnel-like structures described heretofore, form convex and concave Fresnel reflectors. By using flakes fabricated from absorbing materials, Fresnel absorbing structures can be made. By using reflective flakes Fresnel reflectors can be printed upon a substrate. Such Fresnel structures have applications as beam steering devices, for various wavelengths of electromagnetic radiation, in optical and other domains; for example as printable focusing reflectors for antennas.

Figure 26:
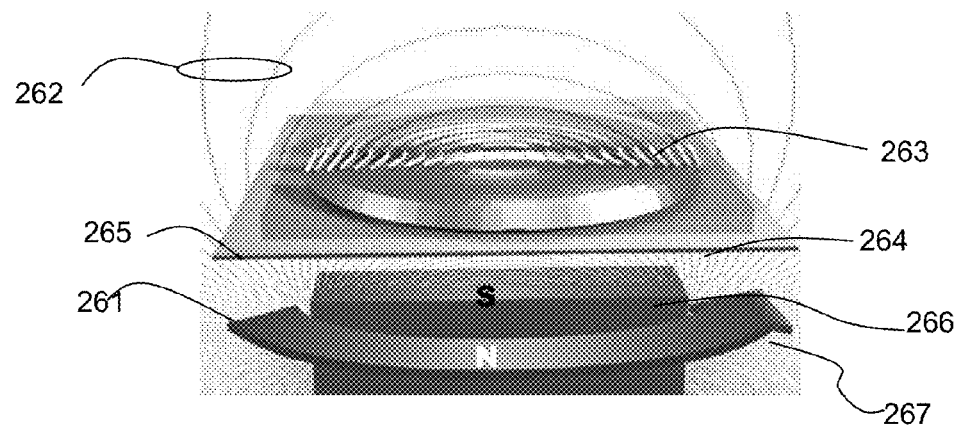
FIG. 26 is an illustration of an axial-symmetric hemisphere-shaped alignment of magnetic particles dispersed in thin layer of the ink forming a printed convex Fresnel mirror.

Referring now to FIG. 26 an illustration is shown wherein an axial-symmetric hemisphere-shaped alignment of magnetic particles 263 dispersed in thin layer of the ink 264 forms a printed convex Fresnel mirror. The cross-section 261 of the magnetic field and lines of the field 262 emanating from the magnet 266 are shown to propagate through the substrate 265. The required magnetic field is achieved by rotating the magnet 266 in the direction of the arrow 267.

Figure 27:
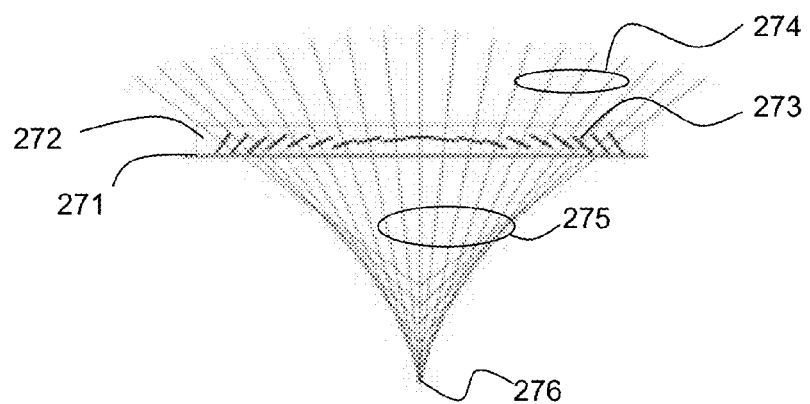
FIG. 27 is cross-sectional view of the Fresnel mirror shown in FIG. 26, wherein lines normal to flakes are shown to converge along a line toward a point.

The Fresnel-like reflective structure formed by the magnetically aligned reflective flakes 273 is clearly illustrated in FIG. 27, wherein imaginary lines 274 shown in the Figure, normal to the surfaces of the flakes supported by the substrate 271 in an ink vehicle 272 are shown to intersect a central line normal to the most central flake. Reference numeral 275 indicates imaginary rays projecting through the flakes or mirrors 273.

Photographs of hemispherical convex mirrors are shown in FIGS. 28A and 28B wherein in FIG. 28A the photo is tilted with its upper edge toward the observer, and in FIG. 28B the photo is tilted with its upper edge away from the observer. The image formation in a printed convex Fresnel mirror is essentially the same as in conventional convex mirrors without compensation for their spherical aberration.

Turning now to FIG. 29, an isometric view is shown of the axial-symmetric convex alignment of diffractive magnetic particles 292 dispersed in the layer of the ink. Flat particles can replace the diffractive particles. The particles 292 are applied to a substrate, for example a paper substrate 291. The regions 293 are devoid of particles for the purposes of illustration. Region 294 depicts the radial direction of the grooves of the particles. Reference numeral 295 denotes the area with rotation of the particles around their normals and with their tilt to the substrate, wherein 296 illustrates an area with circular orientation of the grooves and the maximum tilt of the particles plane to the substrate.

When the diffractive platelets 292 are placed in the magnetic field, the platelets 292 become oriented with their grooves along lines of applied magnetic field. The particles in the region around the center axis of the print 297 are parallel with their planes to the surface of the substrate. Many particles but not all in this region are directed with their grooves toward the center axis of the print.

Figure 30:
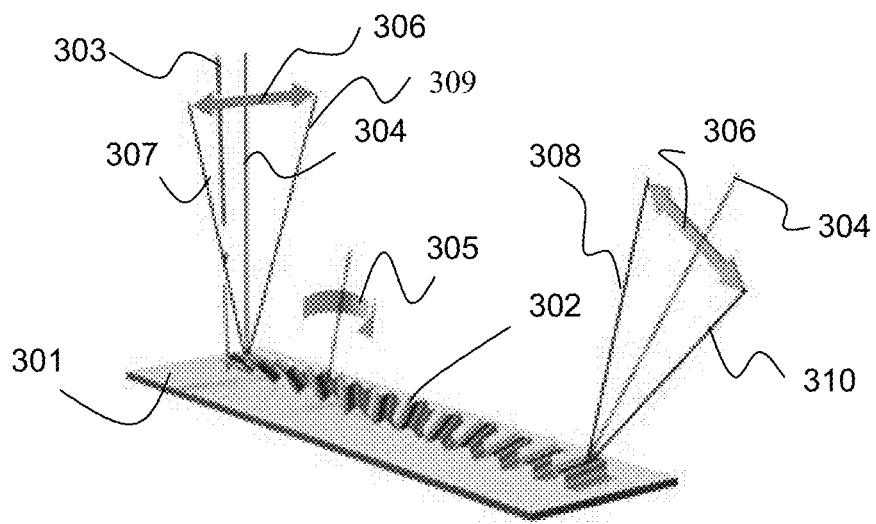
FIG. 30 is a view of the alignment of diffractive particles dispersed in the layer of ink.

The size of this radial alignment region is relatively small and depends upon dimensions of the magnetic field applied to the print. It may be approximately ⅔ of the width of the magnet (in case if the flat permanent magnet was used there). The direction of the grooves and layout of the particles 292 undergo through significant changes with a change of a distance from the center axis. The second area of the print, adjacent to the area of radial alignment of the grooves and surrounding it, contains the particles that rotate around their normals, i.e lines normal to the surface of the particles as shown in FIG. 30, and tilt their planes with respect to the substrate. The particles in the second area rotate around their normals until the grooves become aligned along a circle forming an area of the circular orientation. With the increase in the distance from the center, all particles in this area are circularly oriented. Their tilt to the substrate is at the highest angle.

Referring now to FIG. 30 the position and alignment of diffractive particles 302 in a single radial line of particles dispersed in the layer of the ink deposited on a substrate 301, is shown. A line normal to the particle surface 303 in the first area is almost perpendicular to the substrate. The direction between the orders of diffraction 306 is at 90° to the direction of the particles' line. In the second area, where the distance from the particle to the center axis 302 increases, the particles incrementally rotate around their normals simultaneously tilting on the substrate with their normals directed toward outside of the print. The direction between diffractive orders rotates as well with the rotation of the particles. When rotation of the particles around their normals achieves 90°, the grooves become oriented along a circle. The particles are tilted on the substrate with their normals directed toward outside of the print. Diffractive orders are also tilted and radially oriented. The direction of the $k^{th}$ order of diffraction of particles nearby the center of the print is shown by reference numeral 307; the direction of the $k^{th}$ order of diffraction particles in the area of the circular alignment is shown by reference numeral 308; the direction of the $m^{th}$ order of diffraction of particles nearby the center of the print is shown by reference numeral 309; and, the direction of the $m^{th}$ order of diffraction of particles nearby the center of the print is shown by reference numeral 310.

Figure 31:
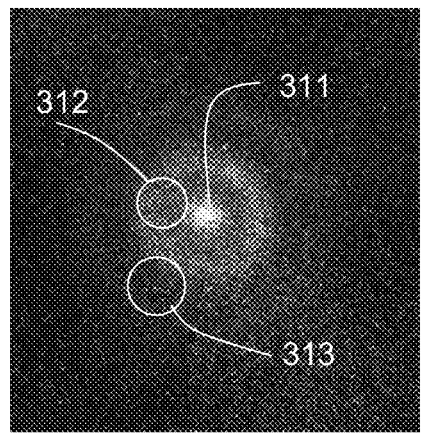
FIG. 31 is a photograph of the printed convex Fresnel mirror made with diluted ink on a black background.

FIG. 31 is a photograph of the printed convex Fresnel mirror made with diluted ink on a black background. A central silver-like area 311 is shown with grooves of the particles shown with a radial orientation. Adjacent thereto is a rainbow like region 312 with a rotation of the grooves yielding strong vibrant colours; the outer region 313 shows rainbow like weak colours. When an observer looks at the central area 311 and the direction of viewing coincides with the direction of the grooves diffraction of the light can not be seen. When the observer looks at the image, a rainbow-like ring surrounds the silver area with a radial orientation of the grooves. The particles in this rainbow-coloured area rotate around their normals lying relatively flat on the substrate. The grooves of the particles change their direction with the rotation and the diffraction of the light begins to generate a rainbow of colours. A tilt of the particles relative to the surface of the substrate in the outer region 313 causes change of direction of the light reflected from the mirror surface. The observer is not able to see reflected light rays in this area because the rays are directed to the bottom of the page. Only a few diffractive orders can be seen generating poor rainbow colours. The print was fabricated by coating a substrate with a black background with a flood layer of the ink containing 5% of flat magnetic particles having averaged size of 20 micrometers and the diffractive grating frequency of 1500 lines/mm. The thickness of the printed layer was close to 9 micrometers. The substrate with the wet ink was placed on the top of a spinning (3"×1.25"×<0.375">) permanent magnet. The ink was cured in UV light after alignment of the particles was completed.

Figure 32:
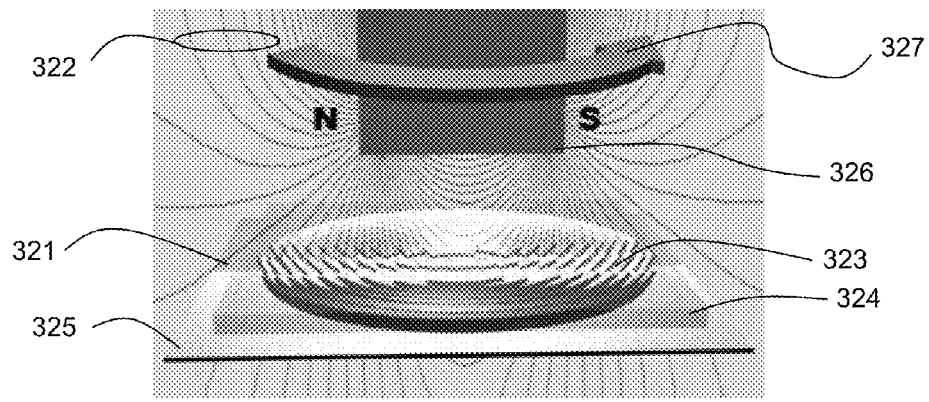
FIG. 32 is a drawing illustrating the axial-symmetric hemisphere-shaped alignment of magnetic particles dispersed in a thin layer of the ink printed upon a substrate.

Referring now to FIG. 32 the axial-symmetric hemisphere-shaped alignment of magnetic particles 323 dispersed in a thin layer of the ink 324 printed upon a substrate 325 in the printed non-compensated concave Fresnel mirror is shown. Reference numeral 321 denotes the cross section of the field having lines 322 which emanate from the magnet 326 which is rotated in the direction of the arrow 327.

Figure 33:
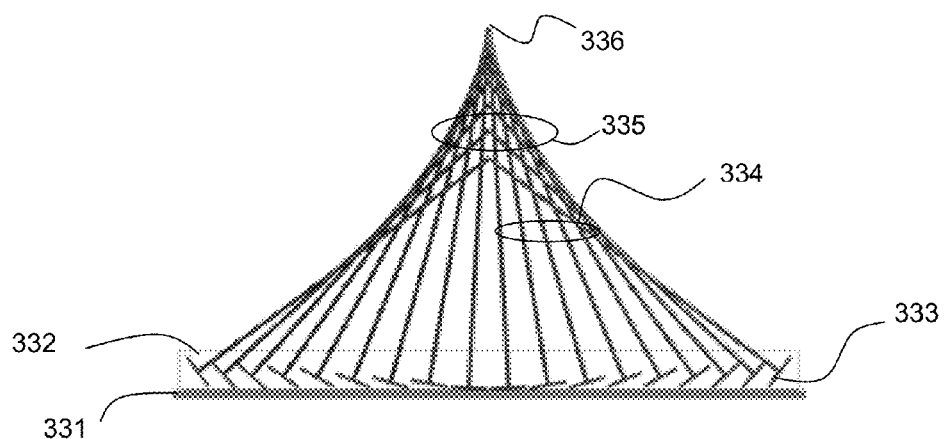
FIG. 33 is a drawing which illustrates that concave-shaped alignment of magnetic diffractive particles 333 having a grating in the form of grooves therein, dispersed in thin layer of ink vehicle 332, with lines normal to the particles surfaces 334.

FIG. 33 is a drawing which illustrates a concave-shaped alignment of magnetic diffractive particles 333 having a grating in the form of grooves therein dispersed in thin layer of ink vehicle 332, with lines normal to the particles surfaces 334. An area of spherical aberration 335 is shown just below where the flakes converge at a focal point 336.

FIGS. 34A, 34B, and 34C are photographs of the prints with hemisphere-shaped alignment. More particularly FIG. 34A is a photograph tilted with its upper edge toward the observer; photograph 34B is tilted with its upper edge away from the observer; and, FIG. 34C shows a shadow of the photographer reflected from the printed mirror.

The image formation in the printed concave Fresnel mirror is essentially the same as in conventional concave mirrors without compensation for their spherical aberration. The mirrors can be compensated to reduse their aberration by correct selection of the shape of applied magnetic field and its intensity, distance between the magnet and the wet ink, ink viscosity and magnetic propertoes of dispersed particles.

FIG. 35 is a plan view of the axial-symmetric concave-shaped alignment of diffractive magnetic particles dispersed in the layer of the ink, similar in many respects to FIG. 29. The substrate 351 is coated with diffractive particles 352 in an ink solution (not shown). An area 353 of the print is devoid of particles for the purposes of illustration only. A region 354 shows the radial direction of the grooves of the particles. 355 is a region with rotation of the particles around their normals (i.e. lines normal to the particle faces) and with their tilt to the substrate; and 356 depicts a region with circular orientation of the grooves and the maximum tilt of the particles plane to the substrate.

Figure 36:
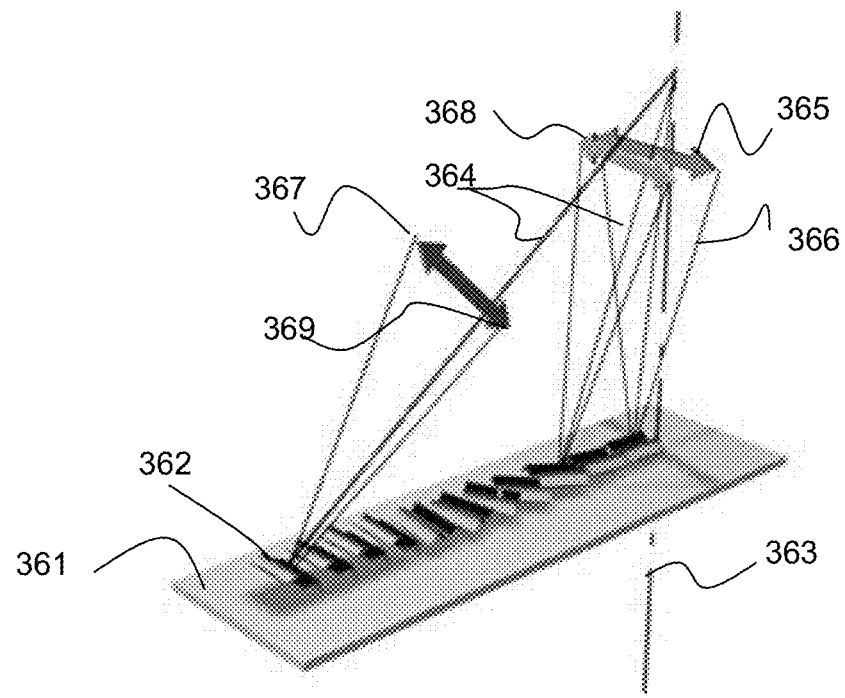
FIG. 36 is a drawing which illustrates the position and alignment of diffractive particles in a single radial line of the particles dispersed in the layer of the ink.

A preferred orientation of the grooves of the particles is in the direction of the center of the cone. Upon being exposed to the magnetic field, diffractive platelets 352 become oriented with their grooves along lines of applied magnetic field. The particles in the region around the center axis of the print are parallel to the surface of the substrate. Many particles but not all in this region are directed with their grooves toward the center axis of the print. The size of this region is small, however depends on dimensions of the magnetic field applied to the print. Direction of the grooves and layout of the particles undergo through significant changes with the change of distance from the center axis. The second area of the print, adjacent to the area of radial alignment of the grooves and surrounding it, contains the particles that rotate around their normals as shown in FIG. 36 and tilt their planes with respect to the substrate. The particles in the second area rotate around their normals until the grooves become align along the circle. With the growth of the distance from the center, all particles in this area are circularly oriented. Their tilt to the substrate is at highest angle.

FIG. 36 illustrates position and alignment of diffractive particles 362 in a single radial line of the particles dispersed in the layer of the ink. The line normal 364 to the particle surface in the first area is almost perpendicular to the substrate 361. Direction between the orders of diffraction is at 90° to the direction of the particles' line. In the second area, where the distance from the particle to the center axis 363 increases, the particles incrementally rotate around their normals simultaneously tilting on the substrate with their normals directed toward outside of the print. Direction between diffractive orders 365 rotates as well with the rotation of the particles. When rotation of the particles around their normal achieves 90° the grooves become oriented along a circle. The particles are tilted on the substrate with their normals directed toward outside of the print. Diffractive orders now are also tilted and radially oriented. The direction f the $k^{th}$ order of diffraction of particles nearby the center of the print is denoted by reference numeral 366; the direction of the $k^{th}$ order of diffraction particles in the area of the circular alignment; the direction of the $m^{th}$ order of diffraction of particles nearby the center of the print is denoted by 368; and the direction of the $m^{th}$ order of diffraction of particles nearby the center of the print is denoted by 369.

An embodiment of this invention will now be described that relates to the fabrication of a hemispherical shaped image in accordance with this invention.

Figure 37A:
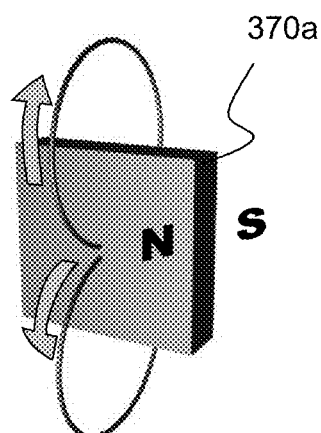
FIG. 37A is a perspective view of a magnet which makes up a magnetic configuration shown in FIG. 37C for providing a dome shaped magnetic field as shown in FIG. 37C.
Figure 37B:
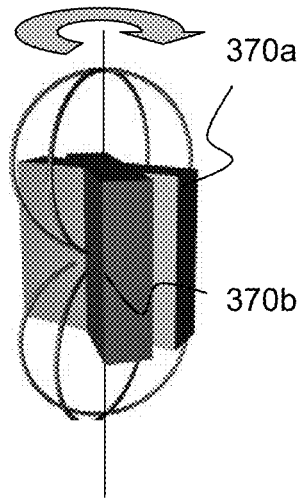
FIG. 37B is a perspective view having some magnet shown in FIG. 37A when is rotates around its vertical axis. The magnet is shown at two different moments of time of its rotation for illustrative purposed to understand how the hemispheric field is formed.
Figure 37:
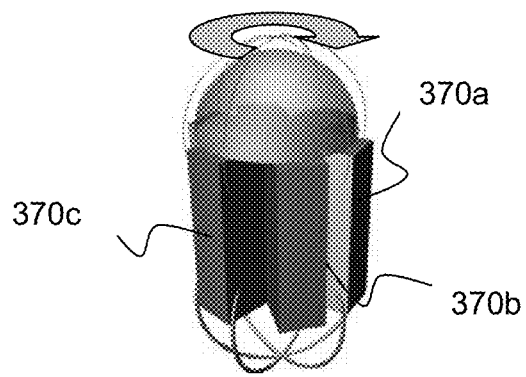
FIG. 37C is a perspective view of a same magnet at three angles of its rotation after the magnet completed a single revolution around the vertical axis.
FIG. 37D is a perspective view of the magnetic arrangement of FIG. 37C wherein sheet having flaked ink applied thereto is disposed in the dome-shaped field and wherein the sheet and field are relatively rotated indicated by the arrows in the subsequent two figures.
FIG. 37E is a perspective view similar to that of FIG. 37D, wherein the sheet is disposed closer to the top of the dome-shaped field and wherein a hemispherical image formed in the ink would be smaller in size than in FIG. 37D.
FIGS. 37F and 37G are images of the rolling 3-D hemisphere made using the magnets of FIG. 37E shown at different positions as the image is tilted from one position to another.
FIG. 37H is a printed image of a hemisphere having dome shaped flakes disposed in an image of a shield.
FIG. 37I is a printed image of a shield having a rolling bar formed along an axis thereof.
FIG. 37J is a composite image of the images formed in FIGS. 37H and 37I, wherein the ink and magnetic fields are applied in stages so that FIG. 37I is applied over FIG. 37H and wherein the centre region is coated only once, when forming the rolling hemisphere.
Figure 37D:
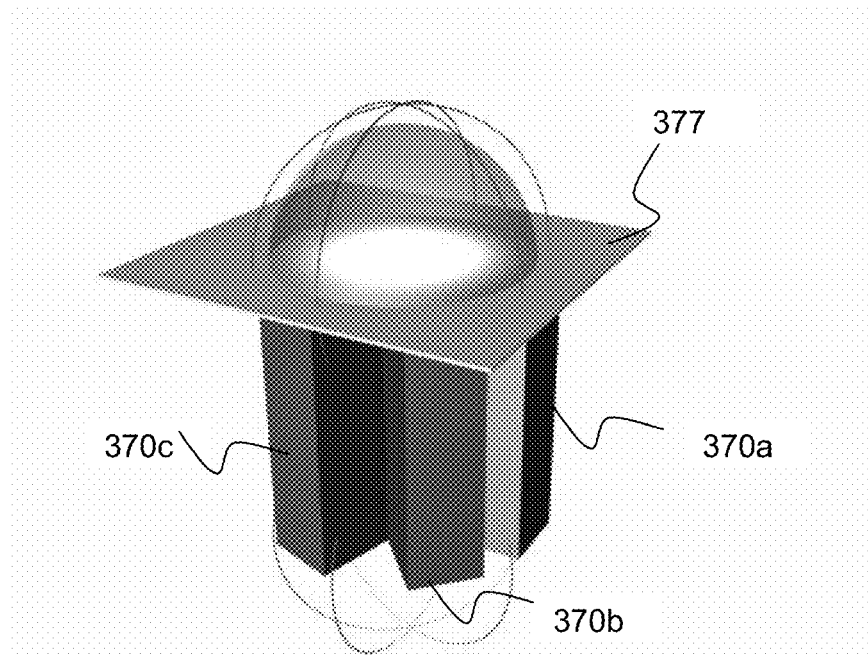
Figure 37:
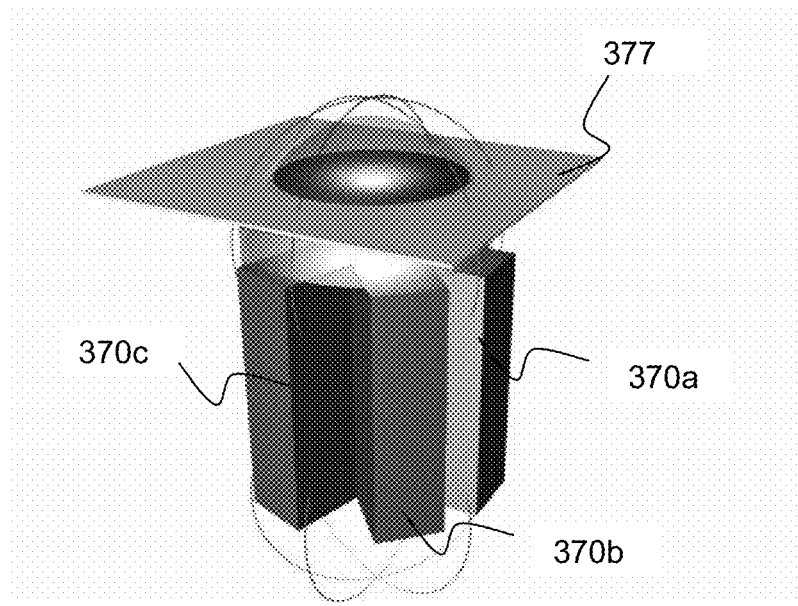
Figure 37F:
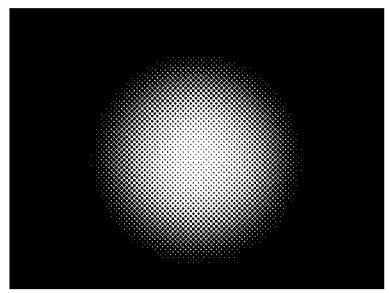
Figure 37G:
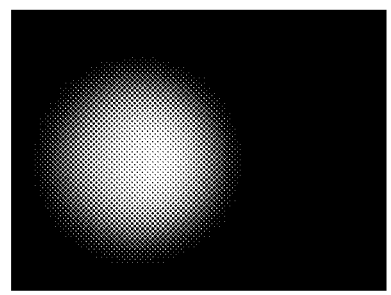
Figure 37H:
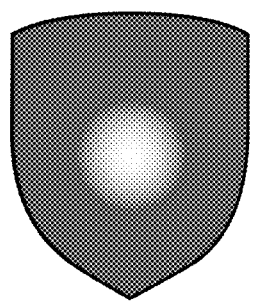

An interesting and striking effect is shown in an alternative embodiment of this invention in FIGS. 37F, 37G, 37H and 37J. FIG. 37F is a printed image of a hemisphere wherein the entire image is coated with alignable pigment flakes. After alignment of flakes as will be explained, the hemisphere is formed. The printed image of the hemisphere shown in FIG. 37F appears as the image shown in FIG. 37G as the substrate is tilted or the light source varied. As the image is tilted from the normal to the left about a vertical axis through the centre, the bright hemisphere which appears much like a ball, rolls with a change of tilt angle. In contrast to the rolling bar, which was capable of rolling in a plane along a line, the hemisphere in FIG. 37F is capable or appearing to move in any x-y direction, depending upon the angle of tilt. Thus, tilting the image about the x or y axis results in the appearance of movement.

Figure 37I:
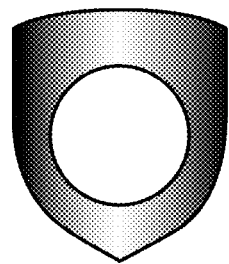
Figure 37J:
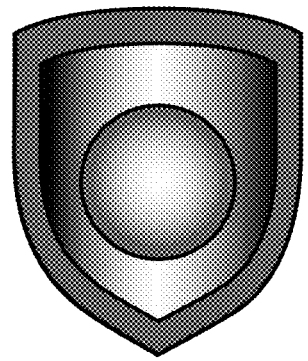

The shield in FIG. 37J uses a combination of a rolling bar and hemisphere effects to provide very interesting combination of effects wherein the shield and hemisphere appear to project out of the page. This is produced in a two stage process, wherein the substrate is first coated with a magnetic coating and a hemisphere is formed and cured as in FIG. 37H. A second coating is applied through a mask or stencil to form the coating of FIG. 37I ensuring that no additional coating material covers the hemisphere. This second coating is placed in a magnetic field so as to produce a rolling bar. The method of forming the dynamic or kinematic hemispherical image described above is more complex than the method of forming the rolling bar. With reference to FIGS. 37A through 37E, the method will now be described. By way of example, the magnet 370a shown in FIG. 37A illustrates a field line above and below the magnet, forming two loops. This diagram purposely only shows these two lines, however, there is essentially a front of lines that would be generated parallel to these lines, spanning the entire magnet. The magnet in FIGS. 370a, 370b and 37C is shown during its rotation around vertical axis at different periods of time. Part of the magnet in FIG. 37B is cut away to illustrate some of the field lines. In FIG. 37C it is clear that the field extending above magnets in 370a, 370b, 370c is dome shaped, as is the magnetic field extending below. A print of a hemispherical kinematic image is formed as in 37E by disposing the coated substrate 377 with fluid ink in the dome shaped magnetic field, just above the magnets as shown in FIG. 37D or with greater separation from the magnets and supported toward the middle of the field while the magnets are spinning. In this exemplary embodiment the velocity at which the magnets or image are relatively rotated is approximately 120 rpm. The image is then removed from the region of the field and is cured. The rotation velocity of the magnets can be slower or faster than 120 rpm, depending on the particles magnetic properties and viscosity of the ink vehicle. If the velocity is too slow however, the quality of the image will degrade.

Figure 38A:
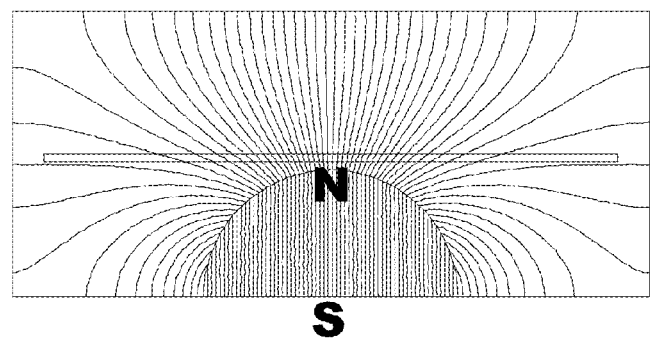
FIG. 38A is a cross-section of a bowl shaped field used to form the image of FIG. 38C.
Figure 38B:
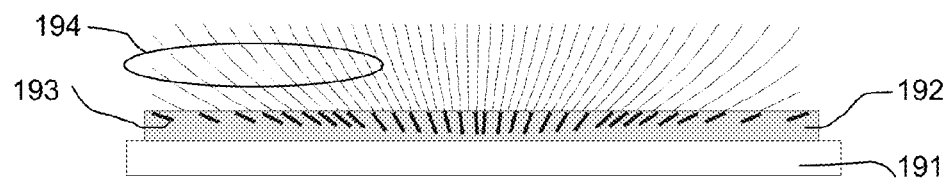
FIG. 38B is cross-sectional of pigment flakes in a carrier aligned in the magnetic field shown in FIG. 38A.
Figure 38C:
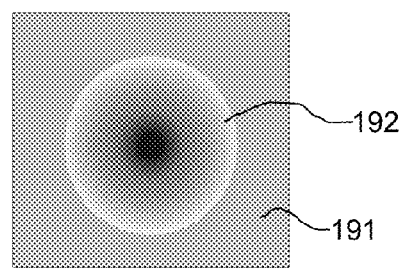
FIG. 38C is an image formed with magnetic flakes in the field shown in FIG. 38A of an inverted hemisphere which appears to be a rolling bowl sunken into the page.

FIG. 38A is an illustration of an alternative embodiment similar but inverted to the image shown in FIG. 37F. A simulated magnetic field from a hemispherical magnet is shown in FIG. 38A. This is the shape of the field that created the image shown in FIG. 38C. The North pole of the magnet is on the top and the particles are aligned concentrically in a funnel-like fashion. The field 194 in FIG. 38B is shown and flakes 193 in a carrier 192 disposed upon substrate 191 are aligned in a funnel like orientation following the field lines. Opposite to the hemispherical effect, this field generated a bright kinematic spot 192 in the middle of the image 191; and the funnel-like alignment of flakes generated a dark kinematic spot in the middle of the image. Although the fields shown and described are formed from permanent magnets, electric fields or electro-magnetic fields can be used in many embodiments. Of course, the field and the particles must be compatible so that the particles are capable of being oriented by the particular field. The particles may be diffractive, and/or may be color shifting.

Furthermore, for example platelet-like magnetic microflakes with a rectangular low-modulated low-frequency grating for fabrication of the magnetic ink for printing of images with optical effects may be utilized.

As has been described heretofore, flat particles of reflective magnetic pigment, being dispersed in non-cured paint or ink vehicle, align themselves along lines of applied magnetic field with their longest diagonals; and diffractive particles, being dispersed in a non-cured paint or ink vehicle align themselves along their grooves in the direction of magnetic lines of applied field because demagnetization of a single particle is smaller along the grooves rather across them.

This phenomenon relates to the cross-sectional thickness of a magnetic particle in different directions: it is smaller along the grooves and larger across them. Specular reflectance of the incident light by diffractive pigments is not high because of specifics of their surface morphology. When printed, the pigment shows diffractive colors under a single or multiple light sources and under the sunlight. However, there is very little color on the print under a dimmed light or under skylight.

Another aspect of this invention is a pigment that combines two particular features of reflective and diffractive pigments: high reflectivity without noticeable diffractive colors and ability to align with grooves along the lines of an applied magnetic field. The pigment has a microstructure with a low-modulated square diffractive grating at a small frequency. Typically, the frequency can be in the range of 2 lines/mm to 500 lines/mm more preferably in the range of 50 lines/mm to 150 lines/mm. Modulation of the grating varies in the range of 20 nm to 1000 nm (more preferably in the range of 30 nm to 200 nm).

Figure 39:
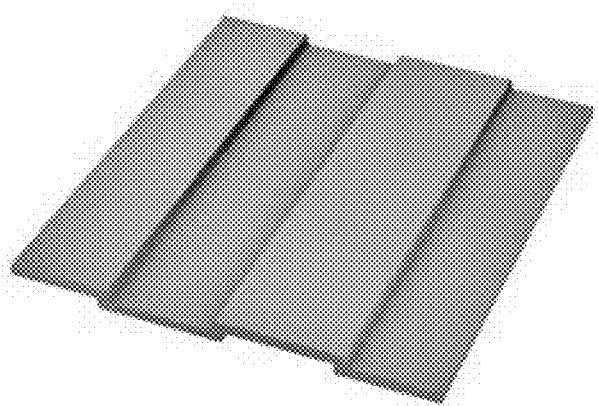
FIG. 39 is a plan view of a single particle of micro structured magnetic pigment.
Figure 40:
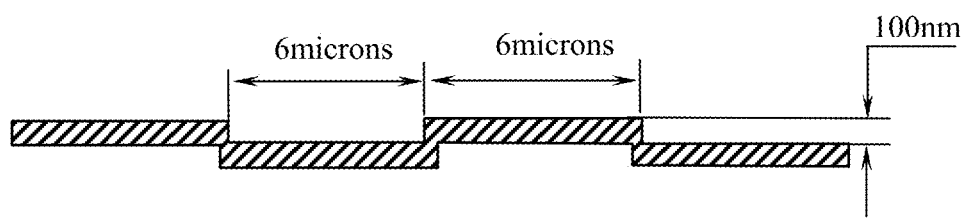
FIG. 40 is a cross-sectional view of a single particle of microstructured magnetic pigment.

Plan views of single pigment particles are shown in FIG. 39 and its cross-section in FIG. 40. This microstructured pigment in accordance with this invention can be fabricated from a microstructured magnetic material covered with organic or inorganic protective coating or from microstructured polymer substrate coated with a magnetic material. More preferably microstructured pigment can be fabricated from microstructured magnetic material enclosed between two layers of a reflective material. An exemplary embodiment of the structure is shown in FIG. 41.

Example 1

Multi-layered structure MgF2/Al/Ni/Al/MgF2 was vacuum-deposited on the top of a polyester rectangular grating similar to shown in FIG. 39. The widths of the hills and the valleys of the grating were 7 microns. The height of the hills was 80 nm. The material was stripped off the embossed substrate and converted to microflakes with the average size of 24 microns.

Before the $MgF_2$/Al/Ni/Al/$MgF_2$ coating was stripped off the substrate, the results were compared with those of the same optical multi-layered stack deposited onto a different polyester diffractive grating having frequency of 1500 lines/mm. The color performance of the coating on both low-frequency and high-frequency substrates was characterized with the gonio-spectrophotometer (Murakami Color Research Labs). Experimental results are shown in FIG. 42.

Results in FIGS. 42a and 42b show that the sample of low-modulated low-frequency rectangular grating generates barely visible diffractive colors when measurements direction is across the grooves and no diffractive colors (not shown in the plot) at all when viewed along the grooves. The direction across the grooves is the most favorable for formation of diffractive effects. Standard 1500 lines/mm sinusoidal diffractive grating shows (FIGS. 42a and b, 2) has a very large color trajectory when viewed in this direction.

Figure 43:
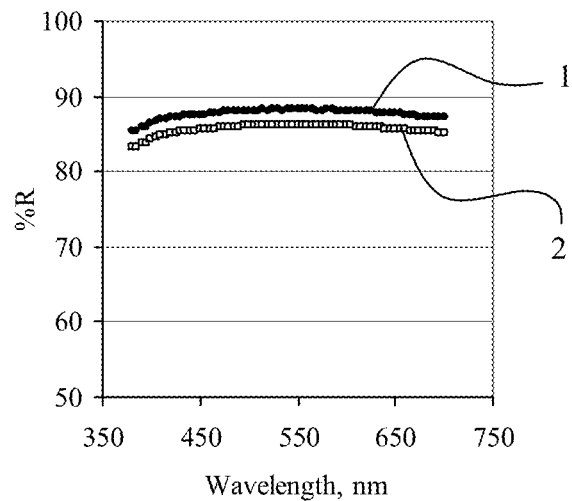
FIG. 43 shows the spectral reflectance of optical stack MgF2/Al/Ni/Al/MgF2 deposited on the top of low-modulated (80 nm) low-frequency (140 lines/mm) rectangular grating.
Figure 44:
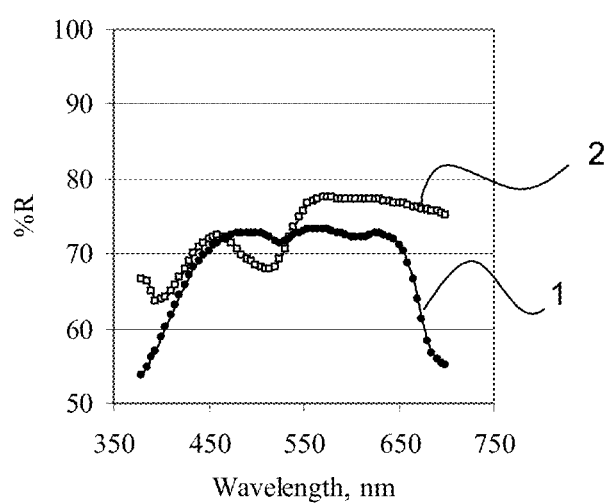
FIG. 44 shows the spectral reflectance of optical stack MgF2/Al/Ni/Al/MgF2 deposited on the top of high-frequency (140 lines/mm).

The diffuse near-normal angle spectral reflectance of these both samples was measured with spectrophotometer Datacolor SF600. Experimental results of % R are shown in FIG. 43 and FIG. 44 wherein (1) indicates % R along the grooves and (2) indicates % R across the grooves.

The results show that the foils sample with the low-frequency grating has a silver-like appearance. There is no color peaks on the curves of reflectance neither along the grooves nor across them. On the contrary, the sample of high-frequency foil shows presence of reflectance peaks generated by diffraction of incident light.

In summary if the grating frequency is low enough, for example less than 200 lines/mm and preferably less than 100 lines/mm, no diffractive effects are seen by the human eye, however this grating advantageously allows alignment along the grating lines. Preferably the grating depth is less than 100 nm.

In another embodiment of this invention, flakes used in the images described in the embodiments heretofore are shaped in hexagonal shapes, which allows for a greater packing density of the flakes within the image and also which advantageously provides flakes which are uniform. A description of manufacturing shaped flakes is found in United States published application 20060035080.

The invention claimed is:

1. A device comprising a substrate and a plurality of flakes comprising at least 1,000 flakes resting in a carrier upon the substrate,
    wherein the plurality of flakes are magnetically aligned so as to form a plurality of adjacent rings, wherein within each ring of the plurality of adjacent rings, the plurality of flakes are tilted at a same angle with respect to the substrate and planes extending from surfaces of said plurality of flakes intersect with one another,
    and wherein the plurality of adjacent rings provide a visible image of a single reflected ring when illuminated with a single light source, and three reflected rings are visible when three light sources illuminate the plurality of adjacent rings.

2. The device as defined in claim 1 wherein the device is a printed light detector.

3. The device as defined in claim 1 wherein the plurality of flakes comprises at least 10,000 flakes.

4. The device as defined in claim 1 wherein a closed region is printed with the plurality of flakes.

5. A method of manufacturing the device defined in claim 1 comprising printing the substrate with ink comprising the plurality of flakes dispersed therein while using a torus-shaped field for magnetically aligning the plurality of flakes.

6. The method as defined in claim 5, wherein the plurality of flakes are magnetically aligned by two stacked magnets of different radii.

* * * * *